United States Patent [19]
Frerking

[11] Patent Number: 5,649,286
[45] Date of Patent: Jul. 15, 1997

[54] METHOD FOR MANAGING THE REGISTRATION OF A WIRELESS UNIT

[75] Inventor: Melvin Duane Frerking, Norcross, Ga.

[73] Assignee: BellSouth Corporation, Atlanta, Ga.

[21] Appl. No.: 339,302

[22] Filed: Nov. 14, 1994

[51] Int. Cl.⁶ .................................................. H04Q 7/22
[52] U.S. Cl. .................................................. 455/435
[58] Field of Search ........................... 455/33.1, 33.2, 455/54.1, 54.2, 56.1, 34.1; 379/59, 60

[56] References Cited

U.S. PATENT DOCUMENTS

| | | | |
|---|---|---|---|
| 4,178,476 | 12/1979 | Frost | 179/2 |
| 4,644,351 | 2/1987 | Zabarsky et al. | 340/825.44 |
| 4,658,416 | 4/1987 | Tanaka | 379/57 |
| 4,670,905 | 6/1987 | Sandvos et al. | 455/33 |
| 4,700,374 | 10/1987 | Bini | 379/60 |
| 4,723,264 | 2/1988 | Sasuta et al. | 379/58 |
| 4,737,978 | 4/1988 | Burke et al. | 379/60 |
| 4,747,122 | 5/1988 | Bhagat et al. | 379/57 |
| 4,748,655 | 5/1988 | Thrower et al. | 379/60 |
| 4,775,999 | 10/1988 | Williams | 379/59 |
| 4,814,763 | 3/1989 | Nelson et al. | 340/825.44 |
| 4,827,499 | 5/1989 | Warty et al. | 379/58 |
| 4,833,701 | 5/1989 | Comroe et al. | 379/60 |
| 4,833,702 | 5/1989 | Shitara et al. | 379/60 |
| 4,901,340 | 2/1990 | Parker et al. | 379/60 |
| 5,428,815 | 6/1995 | Grube | 455/56.1 |
| 5,513,380 | 4/1996 | Ivanov et al. | 455/56.1 |
| 5,524,136 | 6/1996 | Bar-Noy et al. | 455/33.1 |
| 5,548,816 | 8/1996 | DeVaney | 455/56.1 |

FOREIGN PATENT DOCUMENTS

| | | |
|---|---|---|
| 90912460 | 8/1990 | European Pat. Off. |
| 91420322 | 9/1991 | European Pat. Off. |
| 93104965 | 3/1993 | European Pat. Off. |
| WO93/06685 | 9/1992 | WIPO |
| WO94/13114 | 11/1993 | WIPO |

*Primary Examiner*—Edward F. Urban
*Attorney, Agent, or Firm*—Jones & Askew

[57] ABSTRACT

A method for managing the registration of a wireless communication unit in a wireless communication system serving a geographic area divided into cells. Each cell transmits a unique identification signal containing a hierarchy of information regarding the spatial relationship of the cell to other cells of the service area. A wireless communication unit is provided with a masking factor whose value depends on the relative mobility of the unit, communication frequency, and system infrastructure and resources. The unit uses the masking factor to determine a significant portion of each identification signal received by the unit. As the wireless communication unit moves through the service area, this portion of the identification signal of the cell of the unit's location is compared to the corresponding portion of the identification signal of the cell where the unit last registered. The comparison is made to determine whether a preselected relationship exists between the cell of location and the cell of last registration. The wireless communication unit registers only upon determination that the preselected relationship exists, thereby minimizing the number of times the wireless communication unit registers but without sacrificing the efficiency of communication delivery.

16 Claims, 13 Drawing Sheets

Fig_2

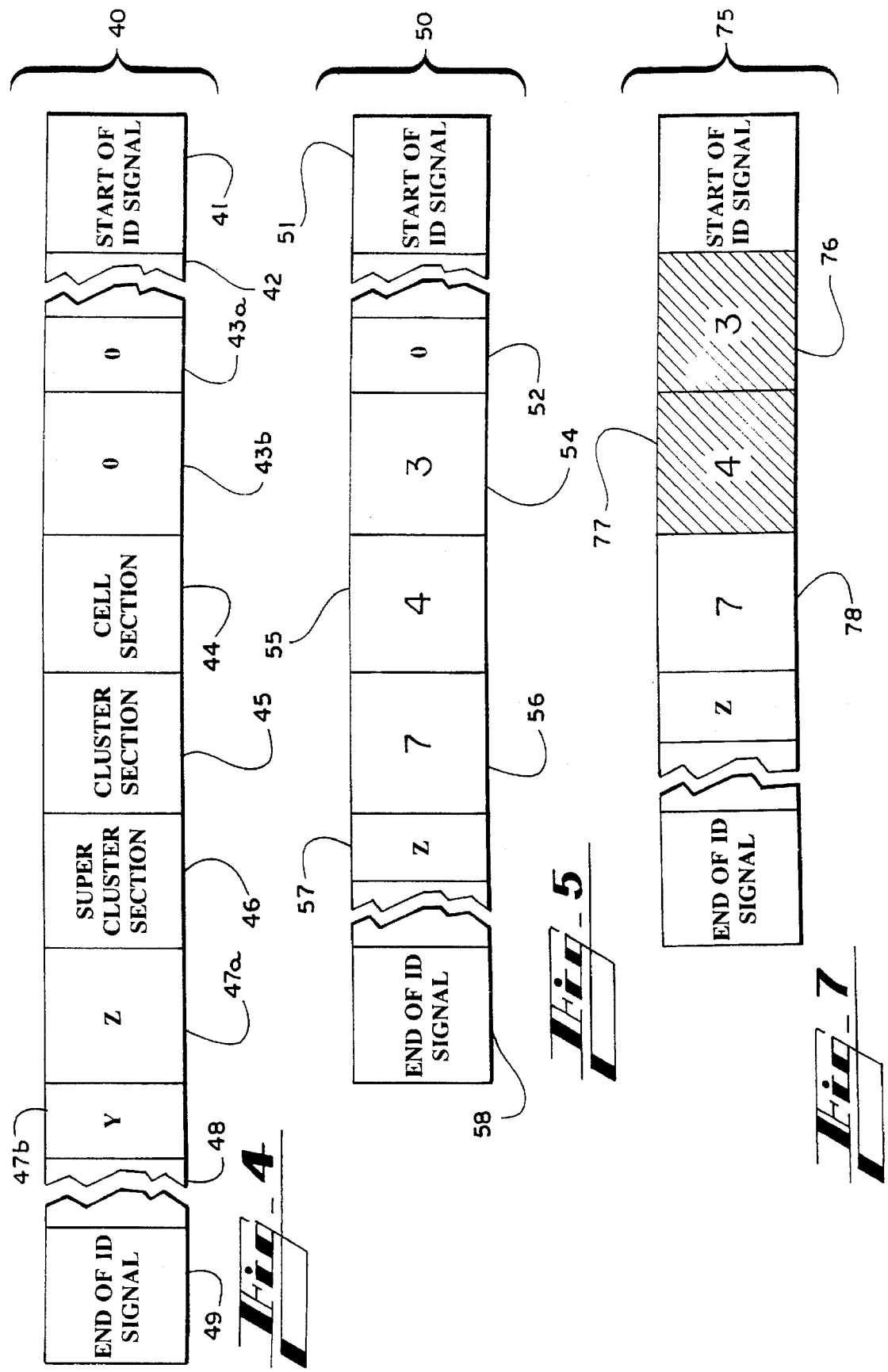

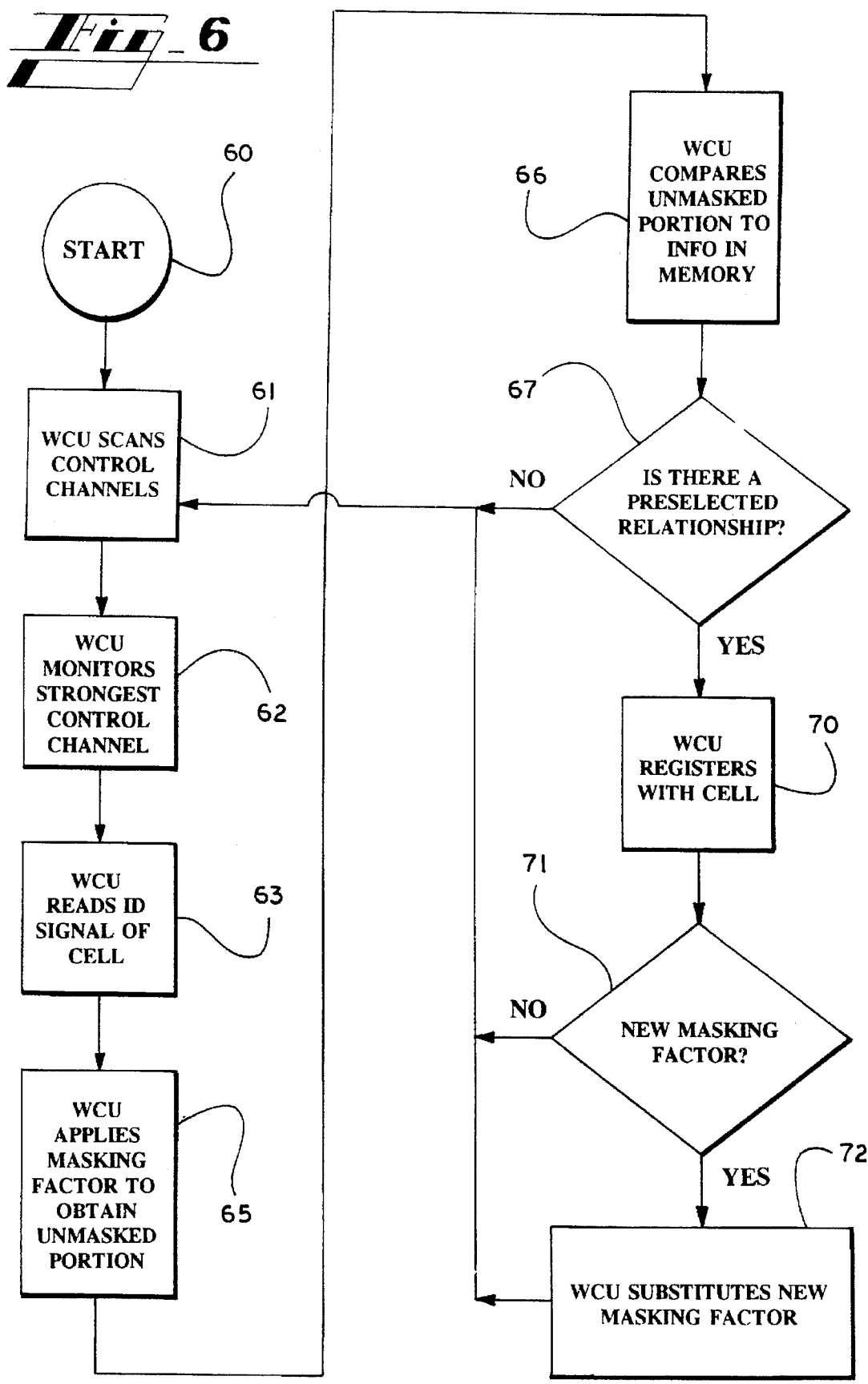

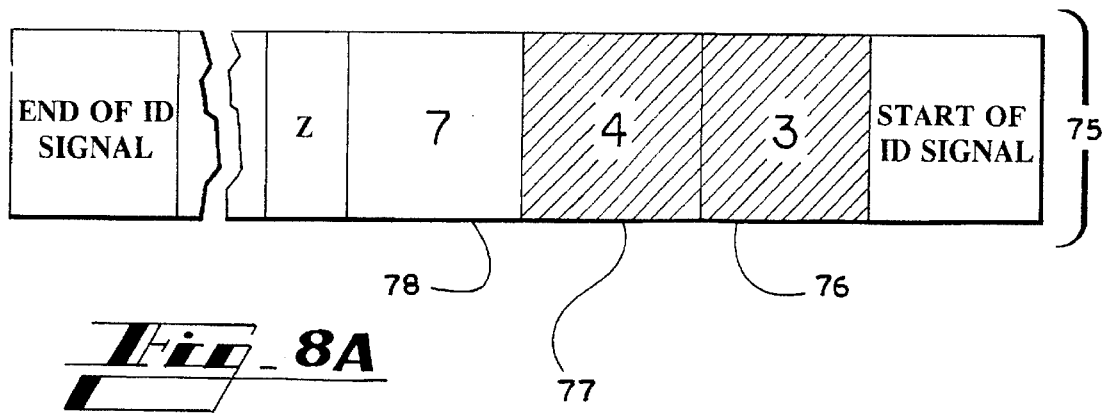
Fig_8A
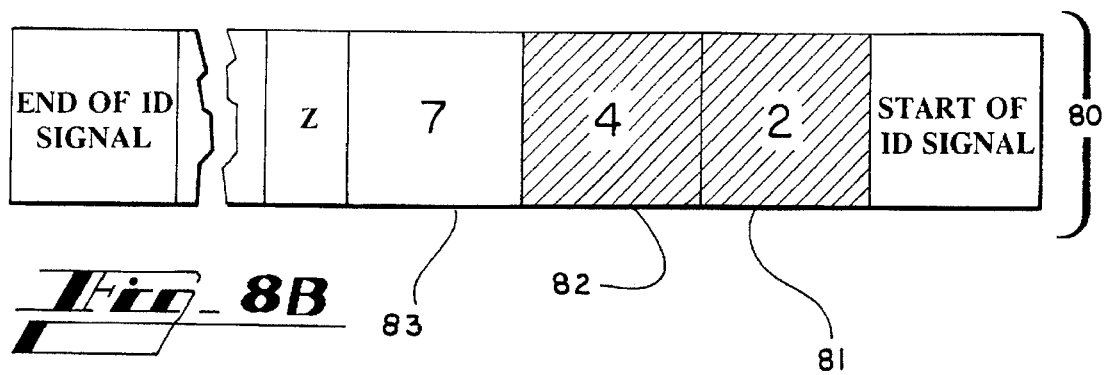
Fig_8B
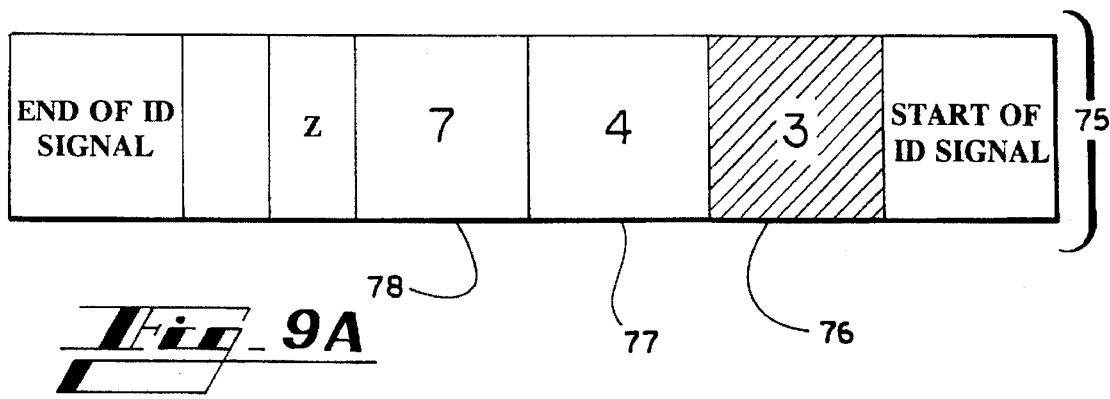
Fig_9A
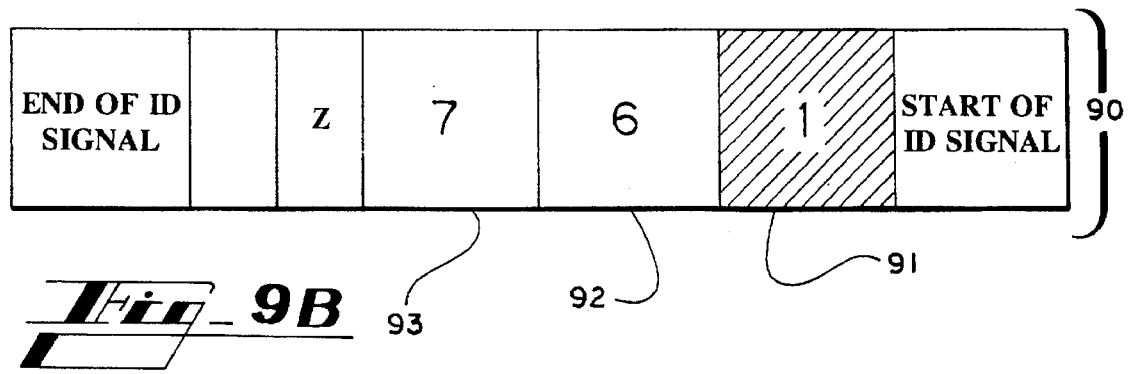
Fig_9B

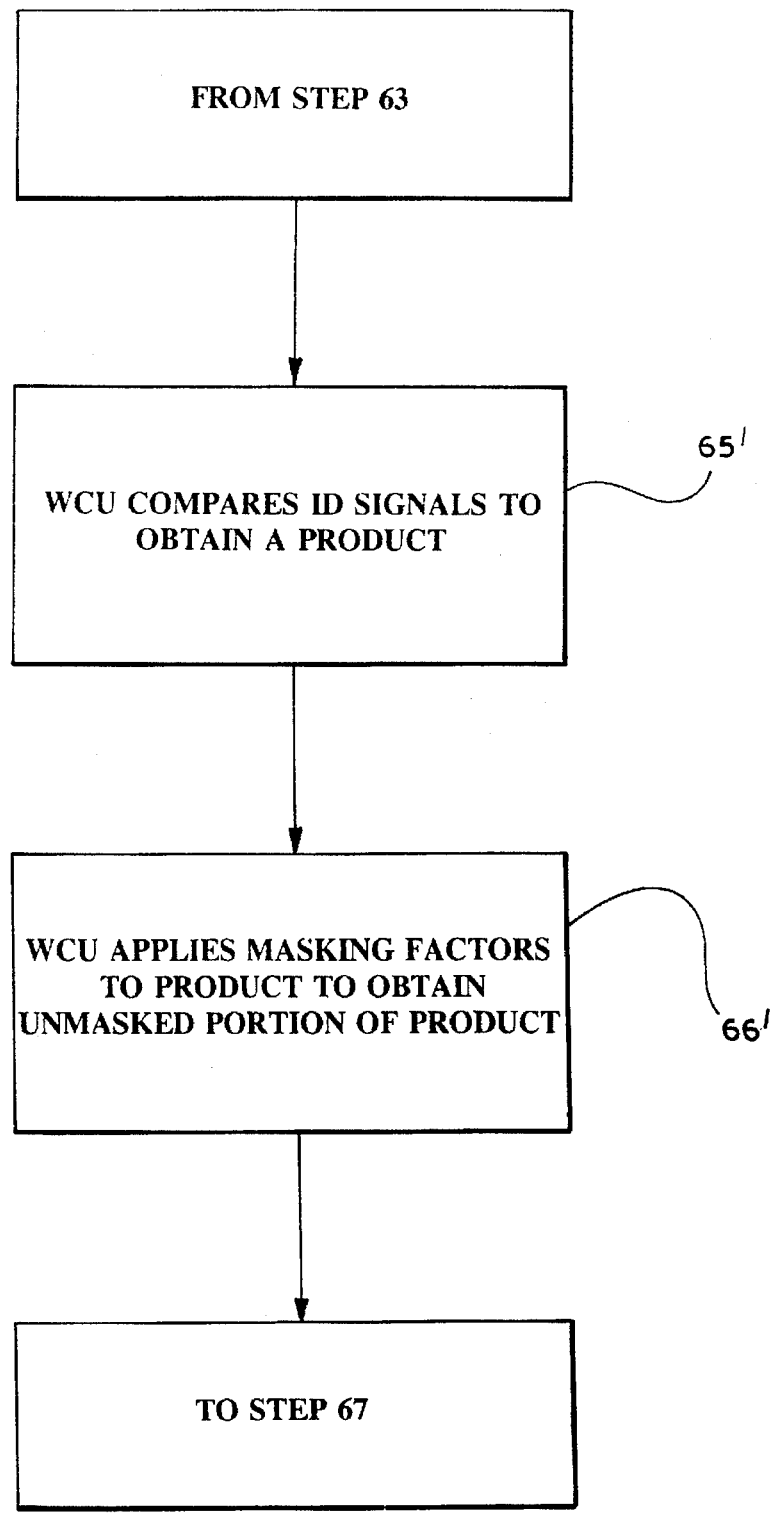
Fig_10

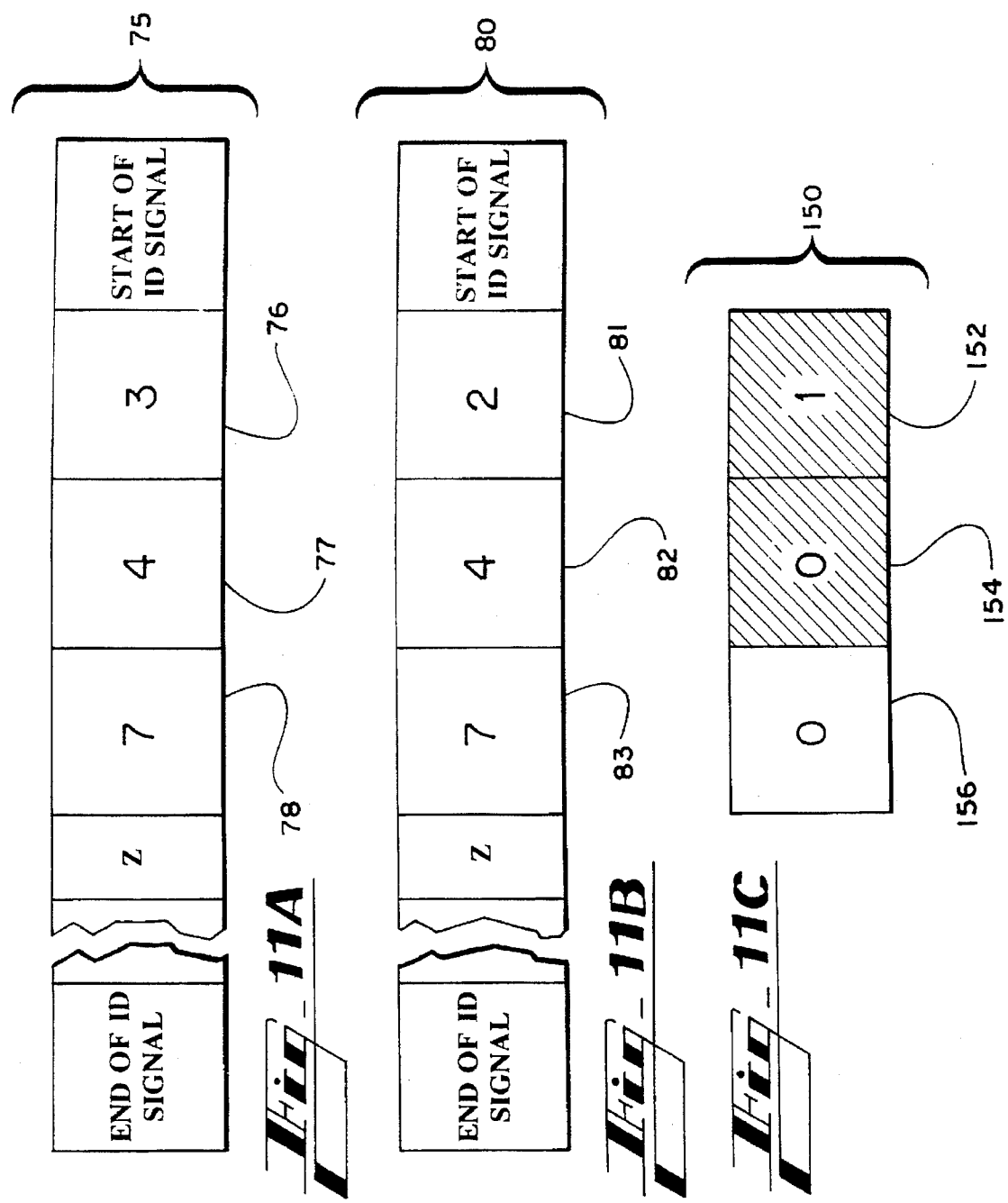

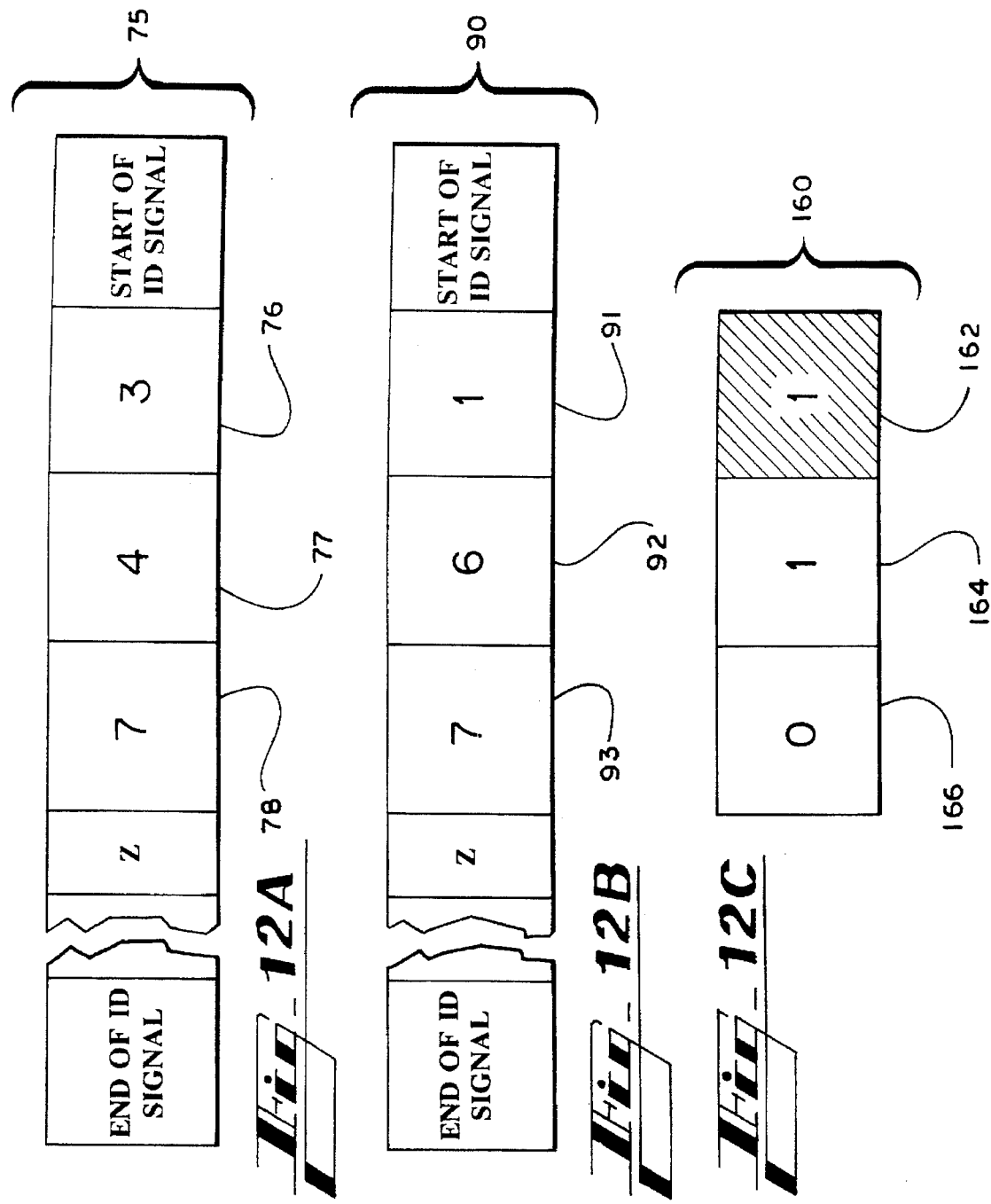

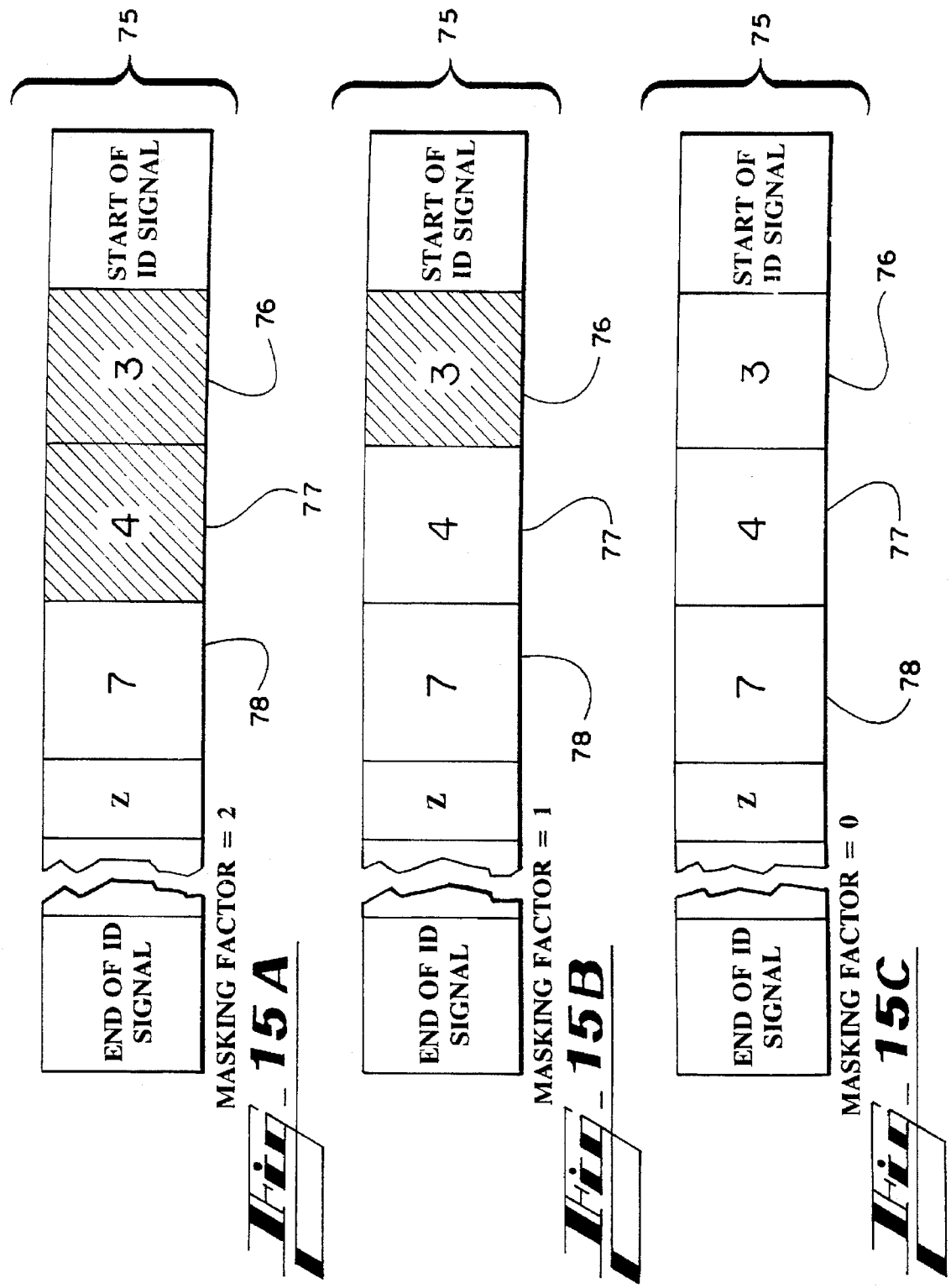

METHOD FOR MANAGING THE REGISTRATION OF A WIRELESS UNIT

TECHNICAL FIELD

The present invention relates generally to wireless communication systems, and more particularly relates to a method and apparatus for managing the registration of wireless communication units in a wireless communication system.

BACKGROUND OF THE INVENTION

Wireless communication systems are growing in size and number and are attracting ever larger numbers of subscribers for innovative communication services. The rise in the number of subscribers is welcomed and is much sought by respective wireless communication systems. Yet, an increase in the number of subscribers presents problems in maintaining a consistent level of quality communication services at low cost.

One service field particularly affected by an increase in the number of subscribers is the procedure used to locate wireless communication units operating within the service area of the system. A wireless communication unit must be located in order to deliver a call or message to the unit. The difficulty in locating a unit stems from one of the chief advantages of a wireless communication unit. The unit may be anywhere within or without the service area of the system.

One method used to locate a wireless communication unit is the North American cellular system, which is used generally by the cellular telephone systems operating in North America. Pursuant to the North American system, the wireless communication system receives periodic identification information (referred to as registration) from a unit operating within the service area. Registration provides the system with an indication that the unit is active and the relative cellular location of the unit. However, registration does not provide the wireless communication system with information regarding the prospective movement of the unit within or without the service area. To locate a unit pursuant to the North American system, the wireless communication system pages the last known cellular location of the unit. If the unit does not respond to the page at the last known location, the system pages for the unit in other cells of the system until the unit responds or until the system is satisfied that the unit cannot be found.

The North American system of locating a wireless communication unit is hindered by its general lack of information with respect to the movement and location of the unit. This lack of information greatly increases the number of pages that the wireless communication system must send and the number of cells that the system must check for the sought-after unit. This lack of information also prohibits the development of subscriber movement profiles and other useful methods which would increase the efficiency of the system in locating the wireless communication unit of a particular subscriber.

Another problem with the system-wide paging approach is its so-called "system overhead". System-wide paging consumes an inordinate amount of network resources in locating a wireless communication unit. Each page made in every cell of the service area increases the amount of radio signaling channel airtime required to locate the wireless communication unit so that a telephone call or message can be completed. An increase in the amount of channel airtime required to locate a wireless communication unit reduces the amount of channel airtime available to complete other calls and messages, and thus reduces the effective capacity of the overall wireless communication system. Time is lost and calls are delayed by paging for a wireless communication unit throughout an entire service area. Delayed calls discourage people from using wireless communication services. The discouragement, in turn, negatively affects wireless communication service revenue. System-wide paging also consumes infrastructure signaling and switching system computing resources.

Wireless communication systems using the North American system provide for automatic registration of the location of a wireless communication unit when the unit is first turned on or when the unit first enters the service area of a foreign wireless communication system. A "foreign" system is defined herein as a wireless communication system other than the system from which service is subscribed by the subscriber using the wireless communication unit. A unit operating in the service area of a foreign system is referred to as a roamer. Automatic registration procedures generally do not track or locate a wireless communication unit after its initial registration with the system. Thus, if a wireless communication unit does not respond to a page made to its location of initial registration, the unit must be paged in each of the cells of the service area until it is found or until the system is satisfied that the unit cannot be found.

Yet another problem with North American system-wide paging is that a wireless communication unit located outside its "home" wireless communication service area (a "roamer") will not receive or "hear" the page broadcast within its own service area. Generally, a roamer is not paged in the foreign wireless communication area unless certain conditions have been satisfied. The first condition is that the subscriber must have registered the presence of the wireless communication unit with the foreign wireless communication system. This condition may be satisfied by a feature available in certain wireless communication systems known as autonomous registration. This feature allows a roamer to register automatically when entering another system. The second condition that must be satisfied is that the home system must know the whereabouts of the roaming subscriber. In some wireless communication systems, this second condition is satisfied by an information exchange between the home and foreign systems. By this exchange, the foreign system provides the home system with information regarding the forwarding of calls to the subscriber roaming in the foreign system's service area. There are established procedures for paging the subscriber through the facilities of the foreign wireless communication service if these conditions are satisfied. However, a roaming subscriber, especially one on the border of the home service area, may traverse the home system/foreign system border numerous times in a single day. Each entry into a different service area requires a new registration. A subscriber thus may quickly tire of re-registering, or may not be aware of the need to re-register.

Another method used to locate a wireless communication unit is the Global System Mobile ("GSM") system, which is used generally by the digital cellular systems operating or scheduled to be deployed in Europe, Australia, New Zealand and in parts of the Orient. In sum, the GSM system keeps track of wireless communication units within the service area by requiring each wireless communication unit to register its location every time the unit moves into a different division of the service area. The geographic area served by a wireless communication system using the GSM system is divided into geographic areas referred to as mobile switching center (MSC) location areas, which in turn are subdivided into cells. Each of the MSC location areas, as well as each of the cells, is assigned a unique identification number. The identification numbers are broadcast periodically over the signaling channels of the respective geographic division of the wireless communication service area.

In operation, each wireless communication unit monitors the strongest signaling channel of the geographic division wherein the unit is located. In particular, the wireless communication unit monitors the signaling channel for the MSC identification number and for telephone call and message signals directed to the unit. When a wireless communication unit enters a new geographic division of a wireless communication system using the GSM system, the unit notes the new identification number broadcast over the division's signaling channels. In response to the new identification number, the unit registers its presence within the division. In this manner, the location of any particular wireless communication unit within the service area is known.

There are several disadvantages to the operation of the GSM system in locating wireless communication units within a service area. One of the principal disadvantages is that the geographic segmentation of the service area into MSC location areas and cells is relatively fixed. Changing the geographic segmentation arrangement is difficult. Yet, finding an optimum formula for the geographic segmentation of a wireless communication service area is problematic. For example, the requirements of the subscribers within the area may change with time, thereby affecting the optimum size of any particular geographic segment of the service area. Sizing geographic divisions too small results in an unnecessary amount of registrations by wireless communication units entering a particular division. Too many registrations unnecessarily burden the wireless communication system infrastructure and block or delay the completion of telephone calls or messages.

It is possible to program a unit to automatically register after a predetermined amount of time has passed since its last registration or subscriber communication. However, with an automatic registration system, frequent wireless communication unit registrations increase the transmit time of the units, thereby draining the energy source of portable or self-contained units. This depletion of the energy source cuts into the amount of time available for the subscriber to place telephone calls, deliver messages or receive same. This negatively affects wireless communication service revenue because it reduces the amount of time that a subscriber has available for placing or receiving calls or messages.

If the wireless communication service area is divided into too few geographic divisions, the GSM system encounters some of the same disadvantages of the North American system. Too few divisions within a wireless communication service area can delay or block telephone calls or messages because the particular unit has to be paged in each of the many cells of the service area. This unnecessary paging consumes signaling channel air time, thereby delaying and blocking other calls.

As a result of the use of fixed geographic divisions, the GSM system loses flexibility in accommodating different types of subscribers and in developing subscriber profiles. For example, under the GSM system, a subscriber who travels the same way to work each day through three geographic divisions of a wireless communication service area using the GSM system has to register the wireless communication unit in each of the three divisions traversed. On the way home, the subscriber registers the wireless communication unit with the same three divisions, but in reverse order. These five or six registrations take place every workday, even if the subscriber's pattern of travel never varies.

As noted, the popularity of wireless communication service continues to increase, and the implementation of more wireless communication systems is planned. Continued development of wireless communication service includes plans for greater numbers of wireless communication units, greater numbers of divisions within a wireless communication service area and smaller sized divisions. The increases in the number of wireless communication units and cells, together with the reduction in the average size of the divisions, exacerbate the problems described above in connection with the location and tracking of a particular wireless communication unit within the service area.

Continued development of wireless communication service also includes plans for reduction in the physical size of wireless communication units. Although smaller wireless communication units may be easier to handle and more versatile in terms of storage space, a smaller wireless communication unit reduces the amount of space within the wireless communication unit dedicated to the battery or other energy source, thereby limiting the available talk time and standby or listen time before recharging or replacing the battery. Thus, a small wireless communication unit has only a limited capacity to make and receive telephone calls or messages. This limited capacity is quickly consumed if the wireless communication unit is required to frequently register its location with the wireless communication system, or to frequently acknowledge pages from the wireless communication system.

Accordingly, there is a need for a wireless communication management system that can locate a wireless communication unit without paging for the unit throughout the entire service area, and that allows for the minimization of the number of times a unit is required to register its location with the wireless communication system.

SUMMARY OF THE INVENTION

Stated generally, the present invention is a method and apparatus for managing the registration of a wireless communication unit in a geographical area served by a wireless communication system. The geographic area serviced by the system is divided into cells with each cell having a base station. A wireless communication unit operating in the service area receives a control signal from the base station of a first cell and registers in the first cell. Upon relocating to a second cell, the wireless communication unit receives a control signal from the base station of a second cell. The unit compares the control signal of the first cell to the control signal of the second cell and determines on the basis of the comparison whether the first cell and the second cell exist in a preselected relationship. If the preselected relationship is present, then the wireless communication unit registers in the second cell. If the preselected relationship is not present, the unit does not register. By conditioning the unit's registration in the second cell on a preselected relationship between the first and second cells, the number of times the wireless communication unit registers with a cell in the system is reduced. Yet, the system is able to deliver a communication to the unit quickly without the necessity of looking for the unit throughout the entire service area of the wireless communication system.

In particular, the service area of the wireless communication system preferably is divided into cells. A selected number of adjacent cells are grouped to form a larger geographic area denominated a cluster, and a selected number of adjacent clusters are grouped to form a larger geographic area denominated a supercluster. Alternate divisions of a service area are possible to suit the particular wireless communication system requirements. For example, each cell may be assigned sectors or the superclusters may be grouped to form a super-supercluster depending upon the needs of the wireless communication system. Further, the present invention provides a hierarchical numbering plan by assigning unique identification signals to the geographic divisions of the area serviced by the wireless communication system.

Each cell is preferably assigned a unique identification signal pursuant to the hierarchical number plan. A cell's identification signal comprises sections which indicate the spatial relationship of the cell to other cells of the service area of the system. Through a base station, each cell transmits its unique identification signal as part of the cell's control signal. Preferably, a wireless communication unit receives an identification signal from the base station of a first cell and registers with the first cell. Upon relocating to a second cell, the wireless communication unit receives an identification signal from the base station of the second cell. The unit compares the identification signal of the first cell to the identification signal of the second cell and determines on the basis of the comparison whether the first cell and the second cell exist in a preselected relationship. The preselected spatial relationship between the first cell and the second cell corresponds to the allowed change in location in the service area of the wireless communication unit without registration. If the preselected relationship exists, then the wireless communication unit registers in the second cell. If the preselected relationship is not present, the unit does not register in the second cell.

More particularly described, in comparing the identification signal of the first cell to the identification signal of the second cell, the wireless communication unit preferably uses a masking factor supplied to the unit by the system. The value of the masking factor preferably depends on the relative mobility of the wireless communication unit, frequency of communications directed to the unit, temporal considerations, and system infrastructure and resources. The unit applies the masking factor to the identification signal of the first cell to provide a portion of the identification signal of the first cell, and applies the masking factor to the identification signal of the second cell to provide a portion of the identification signal of the second cell. The wireless communication unit performs the comparison between the respective identification signals of the first and second cells by comparing the respective portions of the identification signals revealed through use of the masking factor. In the preferred embodiment, the wireless communication unit determines that a preselected relationship exists between the first and second cells when the respective portions of the identification signals of the first and second cells are different. If the respective portions are different, such difference indicates that the wireless communication unit has relocated to a cell outside the unit's "allowed" movement area. Thus, the wireless communication unit registers in the second cell when the respective portions of the identification signals of the first and second cell are different. If the respective portions are not different, then the wireless communication unit does not register in the second cell. In other words, if the corresponding portions of the respective identification signals are the same, the relocation of the unit to the second cell does not constitute a location change that necessitates registration by the unit in the second cell.

In one embodiment of the present invention, the wireless communication unit compares the respective identification signals of the first and second cells to obtain a product. A masking factor is applied to the product to determine a portion of the product. In this embodiment, the wireless communication unit determines that the preselected relationship exists between the first and second cells when the portion of the product is of a predetermined value. Thus, the wireless communication unit registers in the second cell if the product is of the predetermined value. The wireless communication unit does not register in the second cell if the product is not of the predetermined value.

After the wireless communication unit registers in the second cell, the unit then substitutes the identification signal of the second cell for the previously stored identification signal of the first cell. In this manner, the wireless communication unit always compares the identification signal of the cell where the unit is located to the identification signal of the cell where the unit last registered. For example, if the wireless communication unit relocates to a third cell, the pertinent portion of the identification signal of the third cell is compared to the pertinent portion of the identification signal of the second cell in order to determine whether the unit must register with the third cell.

In an embodiment of the present invention, the wireless communication unit determines whether a preselected time has passed since the most recent registration of the unit in a cell of the system. If the preselected time has passed, then the wireless communication unit registers in the cell of the unit's location. In this manner, the wireless communication unit provides the system with information as to the unit's general location in a cell of the system. In another embodiment, the wireless communication unit also determines whether a preselected time has passed since the most recent registration of the unit in a cell of a system. However, instead of registering in the cell of the unit's location, the wireless communication unit substitutes a different masking factor for the masking factor the unit was using in determining whether to register with a cell. The different masking factor generally operates to increase the likelihood of the unit's registration with the system.

In addition, the present invention also provides for the transmission of a different masking factor to the wireless communication for use in determining whether to register in a cell of the system. Thus, if the system determines that the wireless communication unit registers too frequently, the system transmits a different masking factor to the unit so that the probability of the unit's registration is minimized. Similarly, if the system determines that the wireless communication unit does not register enough, the system transmits a different masking factor to the unit so that the probability of the unit's registration is increased.

Registration of the wireless communication unit in the second cell provides the system with updated information regarding the location of the wireless communication unit within the geographic area of the system. Through registration, the system is able selectively to maintain information about the general location of a wireless communication unit as the unit moves through cells of the service area. As a result, the system is able to complete calls and deliver messages more efficiently and with a minimum amount of consumption of network resources and system overhead. A high completion of wireless communication unit calls and delivered messages encourages people to subscribe to and use wireless communication services, which, in turn positively affects wireless communication service revenue. A savings in network resources and system overhead, otherwise wasted by paging for a wireless communication unit throughout the entire service area, also positively affects wireless communication service revenue. Radio signaling channel airtime is reduced and wireless communication service infrastructure signaling and switching system computing resources are conserved.

The selective aspect of registration allows the system to minimize the number of times a wireless communication unit must register while maintaining information as to the general location of the wireless communication unit. Minimizing the number of times that a unit has to register conserves the energy source of the wireless communication unit. Minimizing the number of times that a unit has to register also conserves system infrastructure resources such as signaling channel air time, computer switching time and system overhead.

The selective aspect of registration also allows the system to formulate and to apply a subscriber wireless communication unit profile in tracking and locating of a particular wireless communication unit. A subscriber may follow an established pattern of wireless communication unit use which requires only a minimal number of registrations of the wireless communication unit. A different subscriber may travel randomly through the service area, and may require frequent wireless communication unit registrations for the system to be able to locate the particular unit quickly. The selective registration feature of the system is flexible so as to accommodate a variety of subscriber use profiles, and to dynamically adjust to a subscriber's changing use of a wireless communication unit.

Accordingly, it is an object of the present invention to provide an improved wireless communication registration management system.

It is also an object of the invention to provide a method and apparatus for keeping track of the locations of wireless communication units in a wireless communication system.

It is another object of the present invention to provide a method and apparatus for managing the registration of wireless communication units in a wireless communication system without the necessity of paging for a wireless communication unit throughout each of the cells or divisions of the wireless communication service area.

It is a further object of the present invention to provide a method and apparatus for managing the registration of wireless communication units in a wireless communication system which minimize the number of times that a wireless communication unit is required to register its location with the system.

It is also an object of the present invention to provide a method and apparatus for managing the registration of wireless communication units in a wireless communication system using profiles of wireless communication unit use by subscribers.

It is another object of the present invention to provide a method and apparatus for managing the registration of wireless communication units in a flexible, dynamic manner to account for the features of the wireless communication service and the requirements of the subscriber.

It is also an object of the present invention to provide a method and apparatus for managing the registration of wireless communication units in a wireless communication system even if a wireless communication unit roams outside its home wireless communication service area.

It is another object of the present invention to provide a method and apparatus for efficiently managing the registration of wireless communication units in a wireless communication system and conserving network resources.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 4 is a diagram illustrating an identification signal in its digital data stream form according to the preferred embodiment.

FIG. 5 is a diagram illustrating an identification signal in its digital data stream form according to the preferred embodiment.

FIG. 6 is a flow chart illustrating more particular steps of the general method of operation of the preferred embodiment.

FIG. 7 is a diagram illustrating application of a masking factor to an identification signal in accordance with the preferred embodiment.

FIGS. 8a–b are diagrams illustrating the step of comparing the respective unmasked portions of two identification signals according to the preferred embodiment.

FIGS. 9a–b also are diagrams illustrating the step of comparing the respective unmasked portions of two identification signals according to the preferred embodiment.

FIG. 10 is a flow chart illustrating alternate steps to the general method of operation of the preferred embodiment.

FIGS. 11a–c are diagrams illustrating the alternate steps of comparing identification signals to obtain a product and of applying a masking factor to the product.

FIGS. 12a–c also are diagrams illustrating the alternate steps of comparing identification signals to obtain a product and of applying a masking factor to the product.

FIGS. 15a–c also are diagrams illustrating, respectively, the effect of three masking factor choices on an identification signal.

DETAILED DESCRIPTION OF THE PREFERRED EMBODIMENT

Generally, the present invention comprises a method and apparatus for managing the registration of wireless communication units in a wireless communication system servicing a geographic area divided into spatially adjacent cells. Wireless communication units include personal telecommunications devices that are portable, and/or that are specialized for use in vehicles. The term "wireless communication unit" is used herein synonymously with the term "mobile station" in accordance with the industry standard definition that a mobile station is a station in the domestic public cellular radio telecommunications service intended to be used while in motion or during halts at unspecified points. Electronic Industry Association/Telecommunications Industry Association (EIA/TIA) Standard 553, Mobile Station-Land Station Compatibility Specification, page 1—1, Sept. 1989 (hereinafter "EIA/TIA Standard 553"). The EIA/TIA Standard 553 is incorporated herein by reference. Copies of the EIA/TIA Standard 553 may be obtained from the Engineering Department of the Electronic Industries Association, 2001 Pennsylvania Avenue, N.W., Washington, D.C. 20006, U.S.A. Although the term "wireless communication unit" is used synonymously with the term "mobile station," the use of the present invention is not limited to cellular systems. The present invention also may be used in connection with the Future Public Land Mobile Public Telephone Service (FPLMTS), Personal Communication Services (PCS's) and Enhanced Specialized Mobile Radio services (ESMR's), and other wireless communication systems.

Figure 1:
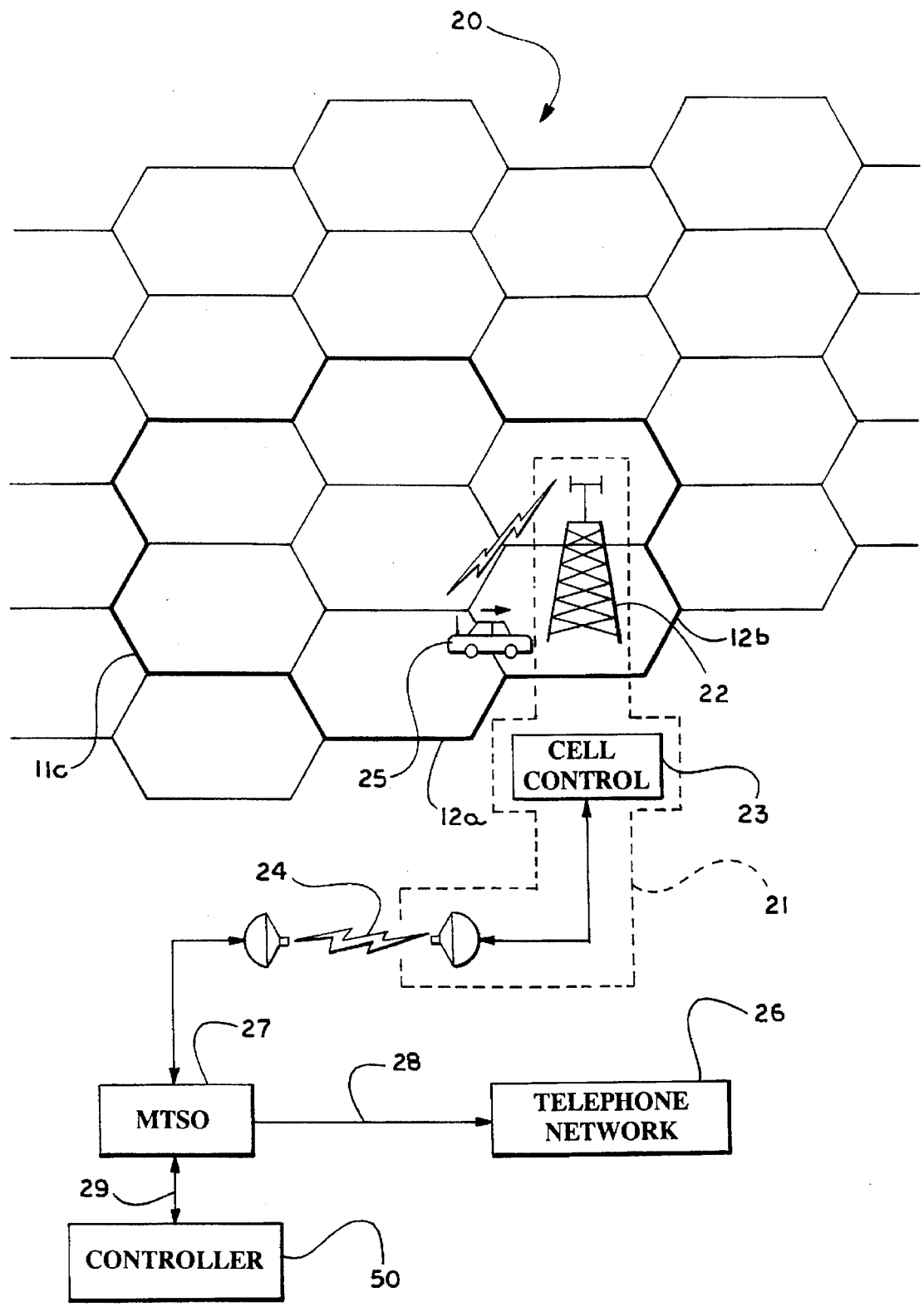
FIG. 1 is a diagram illustrating a preferred embodiment of the present invention.

Referring now to the drawings, in which like numerals indicate like elements throughout the several figures, FIG. 1 illustrates the preferred embodiment of the present invention. Generally, the geographic area serviced by the wireless communication system employing the present invention is divided into spatially adjacent geographic areas known as cells, such as cells 12a, 12b shown in FIG. 1. Additional information regarding the geographical division of the service area is discussed below in connection with FIG. 3.

Each cell has a base station 21 to provide radio communications to wireless communication units active in the cell. The use of base stations in wireless communication systems or cellular mobile radiotelephone (CMR) services is well known to those skilled in the art. The term "base station" is used herein synonymously with the term "land station" in accordance with the industry standard definition that a land station is a station in the domestic public cellular radio telecommunications service, other than a mobile station, used for radio communications with mobile stations. EIA/TIA Standard 553, page 1—1. As illustrated in FIG. 1, base station 21 preferably includes broadcast antenna 22, cell control 23 and a transmission medium or link 24 such as a microwave data link. The transmission medium 24 may comprise other communications technologies such as fiber optics, coaxial cable, or copper pairs. Typically, the base stations use low power transmitters and coverage-restricted receivers. Thus, when car 25 equipped with an operating wireless communication unit first enters cell 12b, the wireless communication unit establishes communication with cell control 23 of cell 12b through a process referred to as registration. Pertinent details of registration according to the present invention are described below in connection with FIG. 6. The term "registration" is used herein in accordance with the definition of that term generally understood by those skilled in the art and as set by the standards adopted by the EIA/TIA. In particular, registration is defined as the steps by which a mobile station, such as a wireless communication unit, identifies itself to a land station as being active in the system at the time the message is sent to the land station. EIA/TIA Standard 553, page 1-4.

Through registration, the wireless communication unit provides cell control 23 with information including the unit's subscriber code. The registration information is transmitted over the transmission medium 24 from the cell control 23 to a mobile telephone switching office (MTSO) 27 or switch. It is well known to those skilled in the art that a conventional wireless communication system or CMR service comprises at least one MTSO 27 coupled to an appropriate array of more or less identically equipped cells. MTSO 27 couples telephone calls and messages to the wireless communication units from the telephone lines of the public switched telephone network 26, and vice versa, through a plurality of telephone lines or other transmission medium 28. In the present invention, MTSO 27 also is connected to controller 50 through transmission medium 29. Thus, by registering with cell 12b, the wireless communication unit provides information as to its identity, location and unit type through cell control 23, microwave link 24 and MTSO 27 to controller 50.

As shown in FIG. 1, the control functions of the present invention are executed by controller 50. The controller 50 may be a computer or a system of computers as necessary or desired. The use of computers for performing controller functions is well known to those skilled in the art. Controller 50 receives information through cell control 23 and MTSO 27 as to the presence (use) of and the registration of a wireless communication unit with a cell. Thus, through receipt of presence and registration information, controller 50 collects information from the cells regarding the approximate location and identity of active wireless communication units operating in the service area. Preferably, controller 50 evaluates the wireless communication unit information, and provides subsequent registration instructions, as necessary, to the wireless communication units. Evaluation of the registration information by controller 50 is based, inter alia, on wireless communication unit user profiles and on relative mobility of the wireless communication units. More particular information regarding the controller and evaluation of registration information is disclosed in connection with FIG. 13.

In particular, controller 50 uses registration information to minimize the number of times a wireless communication unit registers with a cell in the service area without losing track of the wireless communication unit or having to search for the unit throughout the entire service area. Minimizing the number of times a unit registers conserves the battery or other energy source of the wireless communication unit. It also conserves system infrastructure resources such as channel air time, computer switching time and transmission link capacity.

In the present invention, registrations and the time spent looking for a particular wireless communication unit are minimized by the preselection of a spatial relationship between cells of a service area that necessitates registration of the wireless communication unit if the unit is moved from one of the cells in the preselected relationship to the other. For example, a particular spatial relationship between cells is preselected by the system for use by a wireless communication unit in determining whether to register. If the unit moves between cell "A" and cell "B", and if cell "A" and cell "B" exist in the preselected relationship with respect to each other, then the unit registers in cell "B". The system preselects a spatial relationship for each wireless communication unit so as to minimize the registrations of that unit and to minimize the amount of time spent by the system in locating the unit when a communication must be conveyed. The selection of a spatial relationship may be changed as the factors influencing the choice of the relationship change.

There are many factors involved in selection of the spatial relationship. One principal factor is the travel pattern of the wireless communication unit. If the unit is relatively confined to one general area, the system may select a relationship between cells that requires the unit to travel outside this area prior to initiating a registration. In this way, the system minimizes the number of times the unit registers.

Another principal factor involved in selection of the spatial relationship is the amount of communication traffic handled by a wireless communication unit. If the unit receives few communications, the system may select a relationship between cells that permits the unit to travel relatively widely in the service area without a registration. If the unit receives many communications, the system may select a relationship between cells that requires the unit to register each time the unit enters a different cell, different cluster, or different supercluster.

Another factor influencing the choice of a preselected spatial relationship is temporal, in that the time of day and day of the week may influence wireless communication unit usage. Subscribers may remain in one cell during working hours, but may travel in or through other cells or even travel without established patterns after work. Yet another factor is the registration pattern of a wireless communication unit. If a unit has not registered in a preselected amount of time, the system may require the unit to register, even if it has failed to move. In addition, system resources and the use thereof may influence the choice of a preselected spatial relationship. Of course, a combination of these and other factors may be considered in the selection of a spatial relationship.

In the preferred embodiment, the selection of a spatial relationship is implemented through the use of a masking factor in connection with the identification signal of the cell where the unit is located.

Figure 2:
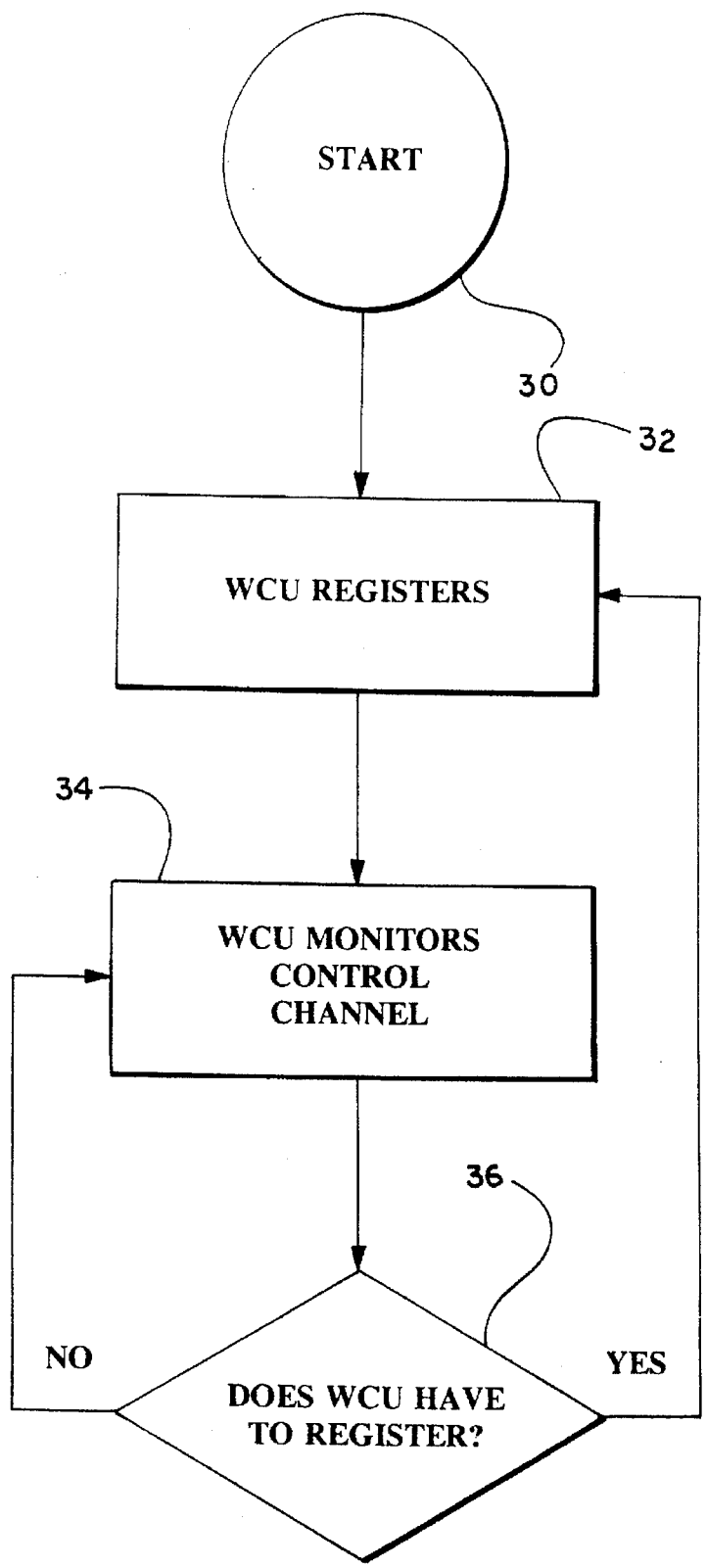
FIG. 2 is a flow chart illustrating the general method of operation of the preferred embodiment.

FIG. 2 is a flow chart illustrating the general method of operation of the preferred embodiment as it applies to the operation of a wireless communication unit in an area serviced by a wireless communication system employing the present invention. The flow diagrams in FIGS. 2, 6, 10 and 13 provide a detailed description of the process steps executed by the corresponding processing circuitry of the systems of the present invention.

FIG. 2 is entered at start block 30. In step 32, the wireless communication unit (WCU) registers with a cell. In the present invention, a unit preferably first registers when the unit is first turned on or when the unit first enters the service area of the system. As noted above, registration establishes radio communications between the wireless communication unit and the cell, and therefore, radio communications between the wireless communication unit and the wireless communication system. Thus, registration alerts cell control 23 to the presence of an active wireless communication unit within the area of coverage of the cell. Cell control 23 informs the controller 50 of the presence of the wireless communication unit in the particular cell of the service area. As noted, registration of wireless communication units in the present invention is accomplished pursuant to the provisions of the EIA/TIA-553 referenced hereinabove. Generally, the wireless communication unit registers in the cell through a process known to those skilled in the art as autonomous registration. The wireless communication unit provides a data message or data packet including the unit's subscriber identification code to the cell where the unit is located by using the cell's control channel. In cellular, the data message typically contains the unit's telephone number, known as the mobile identification number (MIN), and the unit's station class mark (SCM), which identifies certain functional characteristics of the unit. The data message may also include other information such as the unit's electronic serial number (ESN).

As further shown in FIG. 2, after the wireless communication unit registers, at step 34 the unit monitors the control channel of the cell where the unit is located. Each base station typically broadcasts at least one control channel (also called a paging, access or signaling channel) and several voice channels. The term "control channel" is used herein in accordance with the industry standard definition that a control channel is a channel used for the transmission of digital control information from a land station to a mobile station or from a mobile station to a land station. EIA/TIA Standard 553, page 1—1. Typically, the control channels of a cellular system comprise a group of twenty-one channels. The control channels are predetermined so the wireless communication unit looks at all the control channels to determine which control channel has the greatest signal strength. The wireless communication unit then considers itself to be in the service area of the cell control 23 which is transmitting on that particular control channel.

Periodically, each cell transmits a control signal over its control channel and thereby broadcasts this control signal throughout the area of the cell. Generally, a control signal is transmitted on a control channel nominally once per second as is well known to those skilled in the art. The control signal is intended for reception by wireless communication units operating within the cell's area. The control signal is also referred to as an overhead message train (OMT). The control signal provides the wireless communication unit with general information such as the configuration of the wireless communication system, and particular information such as the cells identification signal.

According to the present invention, each cell transmits an identification signal which is unique to that particular cell as part of the cell's control signal. In the preferred embodiment, the cell's identification signal is configured pursuant to the numbering plan discussed below in connection with FIGS. 3, 4 and 5. The identification signal may comprise an identification number or some other type of identifier. Referring again to FIG. 2, in step 36 the wireless communication unit uses the cell's identification signal to determine whether the unit has to register with the cell. The method used by the present invention to determine whether to register is discussed in detail in connection with FIG. 6. If the wireless communication unit does not have to register, the wireless communication unit continues to monitor the cell's strongest control channel, step 34. If the wireless communication unit has to register, the unit repeats the registration of step 32. Typically, the wireless communication unit has to register after it has moved to a cell in a predetermined spatial relationship with the cell where the unit last registered, such as movement or change of location of a selected distance. Alternatively, the wireless communication unit may register after a preselected period of time has elapsed without registration of the wireless communication unit in any cell of the system.

Figure 3:
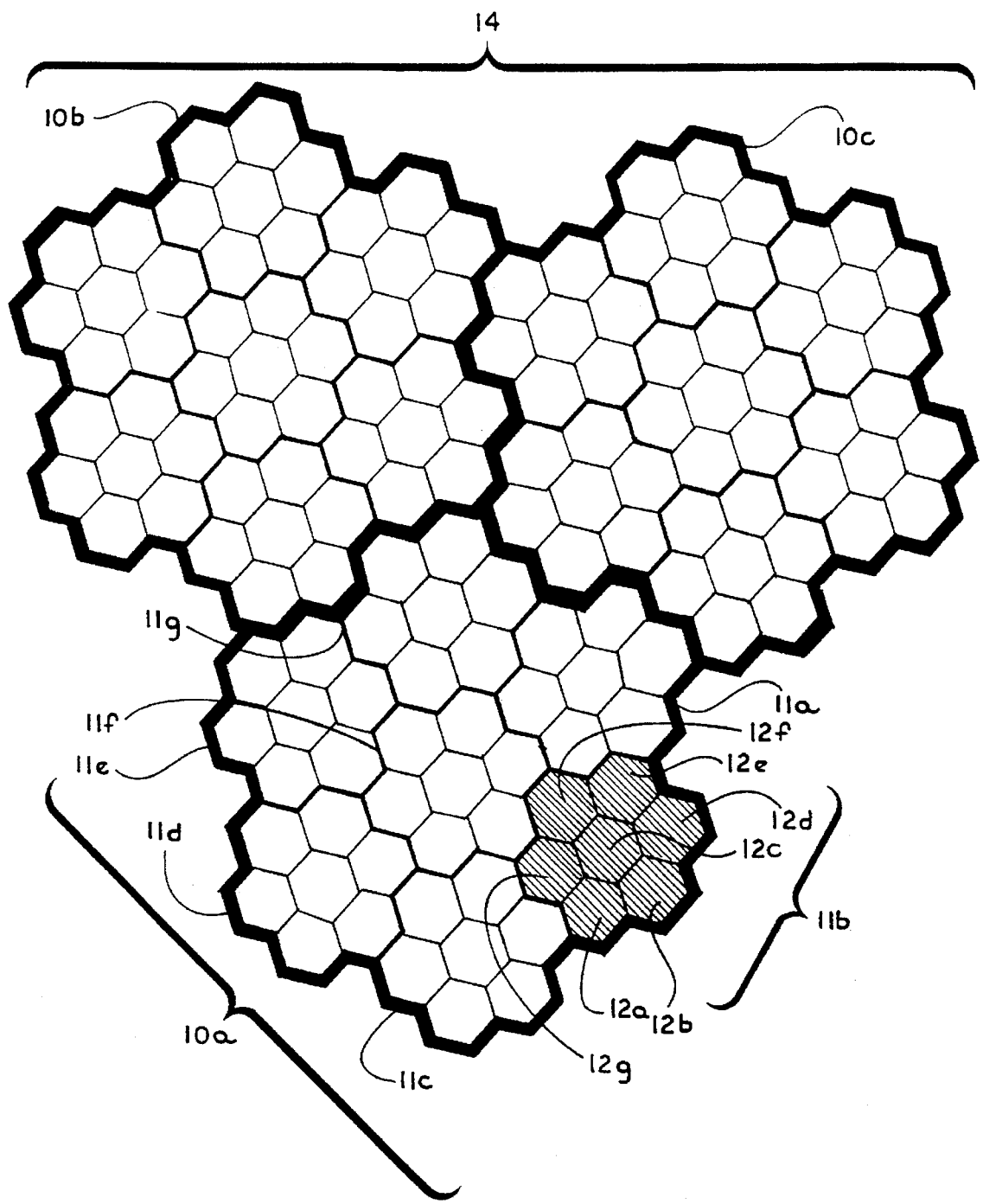
FIG. 3 is a diagram illustrating the geographical division of the typical service area according to the preferred embodiment.

FIG. 3 illustrates an exemplary service area 14 of a wireless communication system employing the preferred embodiment of the present invention. The service area 14 is divided into a hierarchy of geographic divisions. In particular, for simplicity of illustration, service area 14 is conveniently divided geographically into three spatially adjacent areas denominated superclusters 10a–10c. Each supercluster is divided into spatially adjacent areas denominated clusters. For example, supercluster 10a is divided into seven clusters 11a–11g. Each cluster is divided into spatially adjacent areas denominated cells. For example, cluster 11b is divided into seven cells 12a–12g. The geographic division of service area 14 in FIG. 3 is by way of illustration only.

Alternate divisions of such a service area are possible to suit the particular system requirements. For example, each cell may be assigned sectors or the superclusters may be grouped to form a super-supercluster depending upon the needs of the wireless communication system. Also, in service area 14 shown in FIG. 3, all of the same type of geographical divisions are uniform in size, to-wit: every cell is the same size, every cluster is the same size, and every supercluster is the same size. However, uniformity of size is not a requirement of the divisions of the service area of the present invention. The size and grouping of geographical divisions depend on the needs of the wireless communication system including factors such as wireless communication unit traffic in the respective areas, the topography of the areas, and the range of the base stations sited in the areas.

Pursuant to the present invention, each geographic division of the service area is assigned a unique identification signal according to a hierarchical numbering plan. The identification signals are assigned so as to reflect the spatial relationships of the service area's geographic divisions. In the preferred embodiment, the identification signals comprise sections which correspond to the geographic divisions of the service area. The sections are arranged in a hierarchical order in the identification signal corresponding to the hierarchy of the geographic divisions and corresponding to conventional Arabic numerals. Thus, reading an identification signal left to right, the left-most section corresponds to the largest geographical area represented in the identification signal. Similarly, the right-most section corresponds to the smallest geographical area represented.

FIG. 4 illustrates a preferred representative identification signal 40 in its digital data stream form assigned to a cell in the exemplary geographic area illustrated in FIG. 3. Reading right to left, identification signal 40 generally comprises a section 41 marking the start of the identification signal 40, a section 42 with broken lines indicating the possible inclusion of additional sections, place holders 43 $a$–$b$ for expansion of the identification signal 40, sections 44–46 corresponding to the three geographic divisions of the service area 14, place holders 47 $a$–$b$ for expansion of the identification signal 40, a section 48 with broken lines indicating the possible inclusion of additional sections, and section 49 marking the end of the identification signal 40. In the preferred embodiment, an identification signal transmitted by a cell is a digital data stream comprising data fields corresponding to the sections of the identification signal. Thus, the identification signal must include start section 41 and end section 49 to indicate the beginning and end, respectively, of the identification signal. As noted, the place holders 42, 43 $a$–$b$, 47 $a$–$b$ and 48 allow for the expansion of the identification signal. In particular, place holders 43 $a$–$b$ allow for the addition of sections corresponding to sectors or other areas assigned to a cell such as the cell corresponding to cell section 44. Similarly, place holders 47 $a$–$b$ allow for the addition of sections to geographical groupings larger than the supercluster corresponding to supercluster section 46. The use of place holders for later assignment or addition of sections provides flexibility in the numbering plan so as to readily accommodate enlargement or decrease in the number or sizes of the geographical divisions in the service area. It is envisioned that in its full deployment, identification signal 40 may contain as many as thirty-two digits; section 42–43 $a$–$b$ ranging from thirteen to seventeen digits; and sections 47 $a$–$b$ and 48 ranging from sixteen to twelve digits. This will ensure adequate cell identification down to in-building picocells in high rise office buildings on a worldwide scale.

Of the three sections in identification signal 40 corresponding to the geographical divisions of service area 14, cell section 44 corresponds to and uniquely identifies small geographical areas of the service area 14. Cluster section 45 corresponds to and uniquely identifies a cluster of the service area 14. Supercluster section 46 corresponds to and uniquely identifies one of the three superclusters of the illustrated service area 14. This hierarchical order of sections 44, 45 and 46 in the representative identification signal 40 provides information regarding the spatial relationship of the identified cell to the other geographical divisions of the service area. Thus, the cell corresponding to cell section 44 is a division of the cluster corresponding to cluster section 45, and the cluster is a division of the supercluster corresponding to supercluster section 46.

FIG. 5 illustrates a representative identification signal 50 assigned to cell 12$b$, which is one of the cells of the service area 14 shown in FIG. 3. Cell 12$b$ is a division of cluster 11$b$, which is a division of supercluster 10$a$. Preferably, identification signal 50 includes data field 51 indicating the start of the identification signal and data field 58 indicating the end of the identification signal. Identification signal 50 also includes sections 52, 57 as place holders for the later addition or assignment of sections. In addition, identification signal 50 includes sections 54–56 corresponding to the geographical divisions of service area 14, and more particularly, includes a cell section 54, a cluster section 55 and a supercluster section 56.

In the preferred embodiment, the sections of an identification signal comprise numbers. As illustrated in FIG. 5, representative identification signal 50 includes section numbers assigned to the geographical divisions of the service area 14. Supercluster 10$a$ has been denominated as supercluster 7, and thus, "7" is the number represented in supercluster section 56. Cluster 11$b$ has been denominated as cluster 4 of supercluster 7, and thus, "4" is the number represented in cluster section 55. Similarly, cell 12$b$ has been denominated as cell 3 of cluster 4, and thus, "3" is the number represented in cell section 54. The section numbers 54–56 of identification signal 50 corresponding to cell 12$b$ are arranged hierarchically to form identification signal 50 as "743". This identification signal provides information as to the spatial relationship of the geographic divisions represented by the sections. In particular, identification signal 50 indicates that cell 12$b$ (3) is a division of cluster 11$b$ (4), and that cluster 11$b$ is a division of supercluster 10$a$ (7).

In the preferred embodiment, if the identification signal of a certain geographic division of the service area is known, the identification signals of larger geographic divisions may be readily determined. For example, if the identification signal of a cell is known, the identification signal of a cluster or a supercluster may be determined by substituting place holders for the small geographic divisions. Referring to FIG. 5, identification signal 50 ("743") represents cell 12$b$. To obtain the identification signal for cluster 11$b$, a place holder, "0", is substituted for the number ("3") represented in cell section 54. Thus, the identification signal of cluster 11$b$ is "740". To obtain the identification signal for supercluster 10$a$, a place holder, "0", is substituted for the number ("4") represented in the cluster section 55 and in the cell section 54. Thus, the identification signal of supercluster 10$a$ is "700".

Pursuant to the numbering plan of the preferred embodiment of the present invention, all the subdivisions of a particular division of a service area include the section number corresponding to that particular division. Thus, all the cells of a cluster include the cluster section number as part of each of their cell identification numbers. In the example illustrated in FIG. 5, all seven cells of cluster 11b include cluster section number "4" as part of each of their identification numbers. The identification numbers of each of these seven cells are as follows: 741; 742; 743; 744; 745; 746; and 747. Similarly, all the clusters of a supercluster include the supercluster section number as part of each of their supercluster identification numbers. In the example illustrated in FIG. 5, all seven clusters of supercluster 10a include "7" as part of each of their identification numbers. The identification numbers of each of these seven clusters are as follows: 710; 720; 730; 740; 750; 760; and 770. In this common use of section numbers, the spatial relationship of each division of the service area to other divisions is revealed.

Although the preferred embodiment uses a segmented hierarchical numbering plan as described above to indicate spatial relationships among cells of the service area, other methods of indicating such spatial relationships may be used if desired. Further, in the preferred embodiment, there are seven cells within a cluster, seven clusters within a supercluster, and so on. Since signal transmissions are binary by their nature, a numbering scheme based on a multiple of binary is preferred to minimize number base conversion and computational efforts. In addition to the seven units, there is also a placeholder designation, which yields eight values total. An octal (base 8) numbering scheme is therefore ideally suited for the present invention. However, the numbering plan may be implemented in a number system other than base 8. A numbering plan using base 10 is undesirable because of the inefficiency resulting from only seven of the ten values being used. A numbering plan based on binary (base 2) or quaternary (base 4) is unwieldy because of the long strings of digits required. A numbering plan based on hexadecimal (base 16) is, like a plan using base 10, inefficient because only seven of the sixteen values are used.

FIG. 6 is a flow chart illustrating the general method of operation of a wireless communication unit in accordance with the preferred embodiment. The flow chart of FIG. 6 begins at step 60 with the wireless communication unit entering the service area of a wireless communications system through an initial or first cell, such as cell 12b shown in FIG. 3, or with the wireless communication unit being turned on ("powers up") in an initial or first cell of the system.

Following step 60, at step 61 the wireless communication unit scans the designated control channels in a manner well known to those skilled in the art to find the strongest control channel. Next, at step 62, the wireless communication unit selects the control channel which has the strongest signal strength and monitors the selected control channel. At step 63, the wireless communication unit reads the control signal transmitted by the cell, and in particular, reads the identification signal or number provided by the cell as part of the control signal.

After reading the cell's identification signal, the wireless communication unit begins the process of determining whether to register in the cell. Registration of the wireless communication unit in a cell of the system establishes radio communications between the cell and the wireless communication unit, thereby providing the wireless communication system with information regarding the identity and relative location of the wireless communication unit within the service area. With this information, the system does not have to try to locate the unit throughout the entire service area in order to complete a communication such as a telephone call or a message delivery. In the preferred embodiment, the wireless communication unit automatically registers with the system upon first entering or powering up in the service area of the system. Otherwise, as part of the preferred process in determining whether to register with the cell, the unit determines whether the cell where the unit is located exists in a preselected relationship with the cell where the unit last registered. If the relationship exists, the unit registers with the cell. If the relationship does not exist, the unit does not register with the cell.

At step 65, the wireless communication unit applies a masking factor to the identification signal of the cell. The masking factor is preferably applied to determine an unmasked portion of the identification signal of the cell where the unit is located. As explained below, the unmasked portion is used to determine whether the cell where the wireless communication unit is located exists in the preselected spatial relationship to the cell where the unit last registered. As noted above, if the spatial relationship exists, the unit registers with the cell. If the spatial relationship does not exist, the unit does not register with the cell.

In the preferred embodiment, the wireless communication unit receives the masking factor from controller 50. Selection of an appropriate masking factor is discussed below in connection with FIG. 13.

After applying the masking factor to obtain an unmasked portion of the cell's identification signal, the wireless communication unit at step 66 compares the unmasked portion to the information the unit holds in its memory. The comparison is made to determine whether the cell where the unit is located exists in a preselected spatial relationship with the cell where the unit last registered. The information held in memory varies depending upon the activity or movement of the wireless communication unit in the service area. Generally, however, the information held in memory preferably comprises the identification signal of the last cell where the unit registered. Thus, a comparison generally is conducted between the identification signal of the cell where the unit is located and the identification signal of the cell where the unit last registered. In one embodiment, the comparison is conducted between the identification signal of the cell where the unit is located and the identification signal of the cell where the unit last registered. For example, the wireless communication unit registers in a first cell. The identification signal of the first cell is held in the memory of the unit. The unit travels to a second cell. The unit reads the identification signal of the second cell. A masking factor is applied to both identification signals to determine the unmasked portions thereof. The unit compares the unmasked portions of the identification signals.

At step 67, the wireless communication unit uses the results of the comparison to determine whether a preselected relationship exists between the cell where the unit is located and the cell where the unit last registered. If there is no difference between the unmasked portion of the identification signal of the cell where the unit is located and the unmasked portion of the information held in memory, (the answer to decision step 67 is "No"), the wireless communication unit returns to step 61 and scans for the strongest control channel of the cell where the unit is located. The lack of difference indicates that the wireless communication unit has not traveled to a cell that exists in a preselected spatial relationship with the cell of last registration. The identity between the unmasked portion of the identification signal where the unit is located and the unmasked portion of the identification signal held in memory indicates that the corresponding cells share at least one common feature, namely, the geographical grouping in the geographical hierarchy of the service area. In particular, the identity indicates that the corresponding cells share common geographical grouping of the divisions of the service area corresponding to the sections in the unmasked portion of the identification signal where the unit is located. By this commonality, it is determined that the cells do not exist in a preselected spatial relationship to each other, thereby obviating the necessity of registration.

If there is a difference between the unmasked portion of the identification signal and the unmasked portion of the information held in memory, (the answer to decision step 67 is "Yes"), the wireless communication unit registers at step 70. The difference indicates that the wireless communication unit has traveled to a cell that exists in a preselected spatial relationship with the cell of last registration. The lack of identity between the unmasked portion of the identification signal wherein the unit is located and the corresponding portions of the identification signal held in memory indicates that the corresponding cells do not belong to the same geographical groupings of the divisions of the service area corresponding to the sections in the unmasked portion of the identification signal where the unit is located. By this lack of identity, it is determined that the cells exist in a preselected spatial relationship to each other, thereby necessitating registration. In the preferred embodiment, this difference indicates generally that the wireless communication unit has traveled out of its presumed area. In other words, the wireless communication unit has traveled out of the geographic division of the service area corresponding to the most significant section in the unmasked portion of the identification signal held in memory.

Continuing with flow chart FIG. 6, at step 71 the wireless communication unit checks whether it has received a new masking factor. If the wireless communication unit has not received a new or different masking factor, (the answer to decision step 71 is "No"), the wireless communication unit returns to step 61 and scans for the strongest control channel of the cell where the unit is located. The unit may receive a new masking factor as a result of registration in a cell. In one embodiment, a wireless communication unit may receive a new masking factor from the controller of the system at times other than registration. The factors in selecting a masking factor are discussed below in connection with FIG. 13. If the wireless communication unit has received a new masking factor, (the answer to decision step 71 is "Yes"), at step 72 the wireless communication unit substitutes the new masking factor for the previously held masking factor. In the preferred embodiment, this substitution is carried out in the memory of the unit.

To summarize the flow chart of FIG. 6 with respect to the preferred embodiment, when a wireless communication unit enters a cell of the area serviced by the wireless communication system (or powers up in the cell), step 60, the wireless communication unit scans the control channels, step 61, until the unit finds the strongest control channel. The wireless communication unit monitors the strongest control channel, step 62, and reads the identification signal of the cell, step 63. The unit applies the masking factor that the unit holds in memory to the identification signal to obtain an unmasked portion, step 65.

The wireless communication unit compares the unmasked portion of the identification signal to the corresponding portion of the identification signal held in memory, steps 66 and 67. If the compared portions are the same, the wireless communication unit rescans for the strongest control channel, step 61. If the compared portions differ, the wireless communication unit registers with the cell, step 70.

In response to the registration of the wireless communication unit with the cell, the wireless communication unit may be provided with a new masking factor. Also, in an alternative embodiment, the wireless communication unit may be provided with a new masking factor for a reason other than registration. In this alternative embodiment the "NO" output of decision 67 is directed to the input of decision 71. In both embodiments, the wireless communication unit checks for receipt of a new masking factor in step 71. If the wireless communication unit does not receive a new masking factor, the wireless communication unit rescans for the strongest control channel, step 61. If the wireless communication unit receives a new or different masking factor, the unit substitutes the new masking factor for the previously held masking factor, step 72. After substitution of the new masking factor, the wireless communication unit rescans for the strongest control channel, step 61.

In the preferred embodiment, the masking factor that a wireless communication unit applies to the identification signal of the cell corresponds to a whole number. In particular, the masking factor corresponds to the number of sections of the identification signal that are masked so as to reveal only a portion of the identification signal of the cell. The masking factor is applied so that the section corresponding to the smallest geographical division of the service area is masked first. The other sections are masked in ascending order corresponding to the increasing geographical size of the geographic division of the service area represented by each section. Thus, if the masking factor is "1", then only one section of the identification signal is masked. If the smallest division of the service area is a cell, then only the section of the identification signal corresponding to a cell is masked. By such masking process, the unmasked portion of the identification signal reveals the spatial relationship of the cell where the unit is located to the cell of last registration, as well as to other cells and geographic divisions of the service area. This spatial relationship is used as part of the determination regarding registration of the unit. Thus, if the masking factor is "1", then the unmasked portion includes all of the sections of the identification signal except for the section corresponding to the smallest division of the service area. This unmasked portion reveals that the spatial relationship that is to be used in determining whether the unit registers is the cell's relationship with respect to geographical divisions more significant than a cell in the geographical hierarchy of the service area.

FIG. 7 is a diagram illustrating application of a masking factor to an identification signal in accordance with the preferred embodiment. Using cell 12b of FIG. 3 as an example, "743" is the identification signal 75 of that cell. Identification signal 75 is composed of three sections: "7"—supercluster section 78, "4"—cluster section 77 and "3"—cell section 76. The least significant section in the hierarchy of identification signal 75 is cell section 76, the smallest division of the illustrated service area 14. The most significant section in the hierarchy of identification signal 75 is the supercluster section 78, the largest division of the illustrated service area 14.

For illustration purposes on an abbreviated identification signal, if the masking factor provided to the wireless communication unit is "2", the wireless communication unit masks the two least significant sections of the identification signal. In the example shown in FIG. 7, cell section 76 and cluster section 77 are masked as indicated by the cross-hatching. Thus, after masking, the only section that remains unmasked in the identification signal 75 is supercluster section 78. This section constitutes the unmasked portion of the identification signal. This unmasked portion reveals that the spatial relationship that will be used in determining whether the unit registers is the cell's relationship with respect to superclusters of the service area.

Using the identification signal 75 shown in FIG. 7, if the masking factor is "1", the wireless communication unit masks only the least significant section of the identification signal, the cell section 76. After such masking, the unmasked portion of the identification signal 75 comprises supercluster section 78 and cluster section 77. This unmasked portion reveals that the spatial relationship that will be used in determining whether the unit registers is the cell's relationship with respect to superclusters and clusters of the service area.

If the masking factor provided to the wireless communication unit is "0", none of the sections of the identification signal 75 would be masked, and the unmasked portion of the identification signal 75 would comprise the entire identification signal 75. This unmasked portion reveals that the spatial relationship that will be used in determining whether the unit registers is the cell's relationship with respect to all geographical divisions of the service area including other cells, clusters and superclusters.

FIGS. 8a–b are diagrams illustrating the step of comparing the respective unmasked portions of two identification signals according to the preferred embodiment. In particular, FIGS. 8a–b include two identification signals: identification signal 75 assigned to cell 12b and illustrated in FIG. 7; and identification signal 80 assigned to cell 12a. The unmasked portion of identification signal 75 is section 78 containing the number "7" and corresponding to supercluster 10a. In this example, identification signal 80 is held in memory by the wireless communication unit because cell 12a is the last cell wherein the wireless communication unit registered with the system. Upon entering cell 12b, the unit reads the identification signal of cell 12b, and applies the masking factor to determine that the unmasked portion of the identification signal of cell 12b is "7". The unit then compares the unmasked portion, "7", to the corresponding portion of the identification signal of cell 12a held in memory. In this example, the corresponding portion is also "7" because both cell 12a and cell 12b are divisions of the same supercluster 10a.

The identity between the unmasked portion of identification signal 75 and the corresponding portion of identification signal 80 indicates that the corresponding cells are both members of the same supercluster. This common membership determines that the cells do not exist in a preselected spatial relationship to each other, and registration is unnecessary.

In addition, the lack of difference indicates that the wireless communication unit has not traveled out of the geographic division of the service area corresponding to the least significant section of the unmasked portion. The identity between the unmasked portion of identification signal 75 and the corresponding portion of identification signal 80 indicates that the wireless communication unit has not traveled out of supercluster 10a which has been assigned section number "7".

FIGS. 9a–b are additional diagrams illustrating the step of comparing the respective unmasked portions of two identification signals according to the preferred embodiment. In particular, FIGS. 9a–b illustrate an example of an unmasked portion of an identification signal differing from the corresponding portion of the identification signal held in memory. In this example, identification signal 75 (also discussed in connection with FIGS. 5, 7 and 8) has been received from cell 12b where the unit is located. The masking factor provided to the unit is "1", and therefore, only the least significant section, cell section 76, has been masked in the identification signal 75. Also in this example, identification signal 90 is held in the memory of the wireless communication unit. Identification signal 90 comprises three sections: cell section 91, cluster section 92 and supercluster section 93. The portion of identification signal 90 corresponding to the unmasked portion of identification signal 75 comprises cluster section 92 and supercluster section 93. Thus, the unit compares the cluster section 77 and supercluster section 78 of identification signal 75 to the cluster section 92 and supercluster section 93 of identification signal 90. By such comparison, the unit determines that cluster section 77 (including the number "4") differs from cluster section 92 (including the number "6"). The difference indicates that the unit has traveled out of the cluster "6" corresponding to cluster section 92 and into a different cluster "4" corresponding to the cluster section 77. This lack of identity in the cluster sections indicates that the corresponding cells do not belong to the same geographical groupings of the divisions of the service area. By this lack of identity, it is determined that the corresponding cells exist in a preselected spatial relationship to each other, thereby necessitating registration. As a result of this difference determination, the unit registers in the cell corresponding to identification signal 75.

FIG. 10 is a flow chart illustrating an alternate preferred method to steps 65–66 of FIG. 6. In the alternate method, the unit first compares the identification signals and then applies the masking factor. After step 63 of FIG. 6, in alternate step 65' the unit compares the identification signal of the cell of the current location to the identification signal of the cell of last registration to obtain a product. The product is obtained by comparing the respective sections of the identifications signals, and noting the identity or lack of identity between the sections in the corresponding section of the product. Thus, the product preferably includes a section with an identity or lack of identity indication for each of the sections of the identification signals. In alternate step 66', the wireless communication unit applies a masking factor to the product. The masking factor is applied in the same manner as described above in connection with step 65, but the result of the masking factor application in the alternate method is an unmasked portion of the product. This unmasked portion comprises one or more sections depending upon the masking factor and each section of the unmasked portion of the product includes the above-determined indication of identity or lack of identity. After the application of the masking factor in alternate step 66', the wireless communication unit proceeds to step 67 of FIG. 6.

FIGS. 11a–c include diagrams illustrating the application of the alternate steps 65' and 66'. Identification signal 75 represents cell 12b (FIG. 3) and identification signal 80 represents cell 12a (FIG. 3) or described in connection with FIGS. 8a–b. In this example, identification signal 80 is held in memory by the wireless communication unit because cell 12a is the cell where the unit last registered. Upon entering the cell 12b, the unit reads identification signal 75. The unit then makes a section by section comparison between identification signal 75 and identification 80 to obtain a product 150. In further detail, the product is obtained by comparing the supercluster section 76 containing the number "7" to the supercluster section 93 containing the number "7" by noting that the numbers are the same, and by indicating such identity by placing a "0" in the supercluster section 156 of the product 150. In a similar fashion, the numbers of the respective cluster sections 77 and 82 are compared, the identity in the numbers is noted, and a "0" is placed in the cluster section 154 of the product 150. Finally, the numbers of the respective cell sections 76 and 81 are compared, the difference in the numbers is noted, and a "1" is placed in the cell section 152 of the product 150. Thus, the product 150 of this comparison is "001".

In this alternate method, once the product has been determined, the wireless communication unit applies the masking factor to the product. The masking factor is applied to the product in the same manner as the masking factor was applied to identification signals as described above in connection with FIGS. 8a–b and 9a–b. In this example, the masking factor is "2", and the masking factor is applied so that the two sections of the product corresponding to the two smallest geographical divisions of the service area are covered. Thus, product sections 152 and 154 are covered, leaving the unmasked portion of the product 150 as supercluster section 156, which includes the number "0". The unmasked portion 156 has a value of "0" which indicates that the predetermined relationship is not present.

FIGS. 12a–c illustrates another example of the application of the alternate steps 65' and 66'. Identification signal 75 represents cell 12b (FIG. 3) and identification signal 90 which is held in the memory of the wireless communication unit. Upon entering cell 12b, the unit reads identification signal 75. The unit then makes a section by section comparison between identification signal 75 and identification signal 90 to obtain a product 160. In this example, the product is obtained by comparing the respective supercluster sections 78 and 93, the respective clusters sections 77 and 92, and the respective cell sections 76 and 91 of the identification signals 75 and 90 to obtain supercluster section 166, cluster section 164 and cell section 162 of product 160. Thus, the product 160 of this comparison is "011".

In this example of the alternate method, the masking factor is "1", and the masking factor is applied so that cell section 162 of product 160 is covered. Thus, the unmasked portion of the product 160 includes cluster section 164 and supercluster section 166, which leaves the unmasked portion numbers as "01". At least one of the unmasked portions, 164 and 166, has a non-zero value, which indicates that the predetermined relationship is present.

As noted above, after the application of the masking factor in alternate step 66', at step 67 illustrated in FIG. 6, the wireless communication unit uses the results of the comparison to determine whether a preselected relationship exists between the cell where the unit is located and the cell where the unit last registered. Referring to FIGS. 11a–c, the unmasked portion of product 150 is supercluster section 152, which includes a "0". The "0" indicates that the cells corresponding to identification signal 75 and identification signal 80 do not exist in a preselected relationship. Because there is no preselected relationship between these cells, (the answer to decision step 67 is "No"), the wireless communication unit returns to step 61 and rescans for the strongest control channel of the cell where the unit is located. Referring to FIGS. 12a–c, the unmasked portion of product 160 is supercluster section 166, which includes a "0", and cluster section 164, which includes a "1". The "1" indicates that the cells corresponding to identification signal 75 and identification signal 90 exist in a preselected relationship. Because the cells exist in a preselected relationship, (the answer to decision step 67 is "Yes"), the wireless communication unit proceeds to register in step 70.

As noted above in connection with FIG. 1, through receipt of registration information, the controller collects information from the cells of the area regarding the approximate location and identity of active wireless communication units operating in the service area. The controller evaluates the registration information, and provides subsequent registration instructions, including masking factors, as necessary, to the wireless communication units. In the preferred embodiment, the controller uses the registration information to preselect a spatial relationship between cells for use by a wireless communication unit in determining whether to register. The movement of the wireless communication unit from a first cell to a second cell existing in the preselected spatial relationship with the first cell results in the unit initiating a registration in the second cell. In particular, the preferred embodiment of the present invention implements preselection of a spatial relationship by the provision of a masking factor through cell control to a wireless communication unit.

Pursuant to the hierarchical numbering plan and masking process of the preferred embodiment discussed above, generally the larger the masking factor used by the wireless communication unit, the fewer times the unit will register. Application of a large masking factor to an identification signal results in only a few or no sections in the unmasked portion of the signal. These few sections correspond to the larger geographical divisions of the service area because the sections are arranged in a geographic hierarchy in the identification signal and because the masking factor is applied to mask the sections in ascending order corresponding to geographic hierarchy. As a result of the large masking factor, the unmasked portions of the identification signals of the traversed cells include few sections for comparison purposes, thereby minimizing the probability of registration. Thus, a wireless communication unit with a large masking factor travels generally without registration through a relatively large number of cells.

The converse of the above statement regarding larger masking factors resulting in fewer registrations generally holds true. The smaller the masking factor used by the wireless communication unit, the more often the unit will register. Application of a small masking factor to an identification signal results in the masking of only a few or no sections of the signal. The unmasked portion of the signal includes more sections. As a result of the small masking factor, the unmasked portions of the identification signals of the traversed cells include more sections for comparison purposes, thereby increasing the probability of registration. Thus, a wireless communication unit with a small masking factor that travels into a different geographical division such as a different cell, cluster, or supercluster generally is required to register.

In sum, if it is determined that the registrations of a particular wireless communication unit should be minimized, the controller provides a relatively large masking factor to the unit. If it is determined that a particular wireless communication unit should be registering more often, the controller provides a relatively small masking factor.

As noted above, a masking factor is the preferred embodiment's implementation of the selection of a spatial relationship between cells. The spatial relationship is used by a wireless communication unit in the determination of whether to register in a particular cell. Some of the factors that result in the selection of a particular spatial relationship and corresponding masking factor are discussed above in connection with FIG. 6. Generally, these factors include, inter alia, the travel pattern of the wireless communication unit, the amount of communication traffic handled by a unit, temporal considerations such as time of day, and day of the week, the registration pattern of the unit, and the extent and use of system resources in handling communications.

As discussed above, the masking factor is a key element of the preferred embodiment in controlling the number of times and places that a wireless communication unit registers. The preferred embodiment provides for the transmission of a new or different masking factor to a wireless communication unit when the factors affecting the selection of the previously provided masking factor change. This ability to provide a new masking factor to a particular wireless communication unit enables the present invention to optimize the registration process according to the needs of the subscriber as well as to the resources of the wireless communication system. Minimizing the number of times that a unit has to register conserves the battery or other energy source of the wireless communication unit. Minimizing registration times also conserves system infrastructure resources such as signaling channel air time, computer switching time and system overhead. Optimizing the registration process does not sacrifice the communication delivery capability of the wireless communication system but, rather, accommodates a variety of subscriber use profiles, and dynamically adjusts to a subscriber's changing use of a wireless communication unit.

Figure 13:
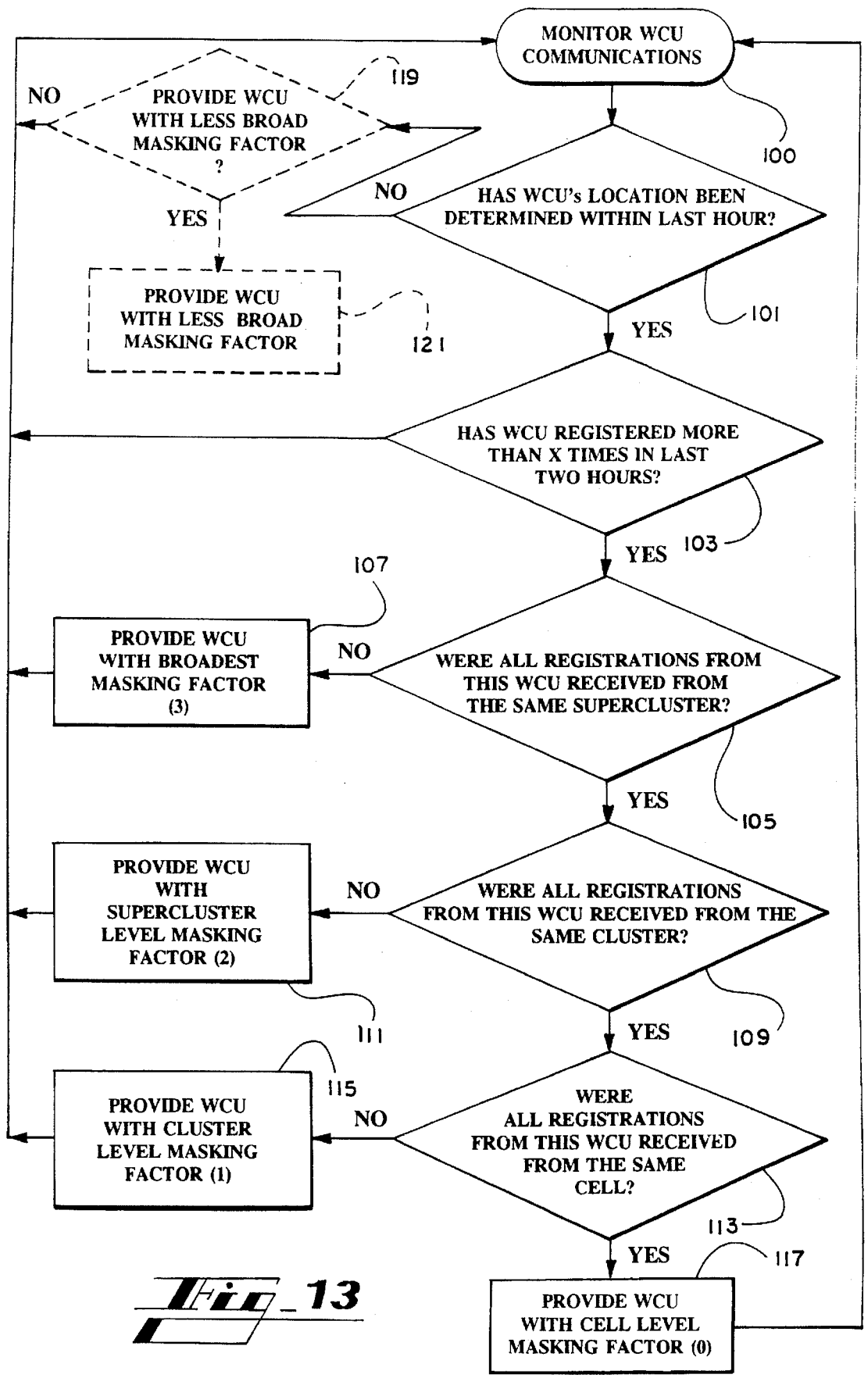
FIG. 13 is a flow chart illustrating the general method executed by the controller according to the preferred embodiment.

FIG. 13 is a flow chart illustrating the general method executed by the controller 50 (described in connection with FIGS. 1 and 13) in the selection of masking factors for a wireless communication unit. It will be understood that the general method is illustrated by reference to a simplified identification signal and a simplified masking factor. Generally, the selected size of the masking factor will take into account the number of sections in the identification signal. The controller 50 may be a computer or a system of computers as necessary and as known to those skilled in the art.

Upon review of FIG. 13, it will be apparent that the general methodology of selection of a masking factor for a wireless communication unit is to determine whether a unit's location has been determined within a preselected time, and then, to determine if more than a preselected number of registrations have been received from the unit within a preselected time. If more than a preselected number of registrations have been received, then the method proceeds to determine the smallest subdivision (supercluster, cluster, cell, etc.) of the service area encompassing the area from which the registrations of the unit have been received. A service area with more or fewer subdivisions than that of the example provided will use a methodology for selection of a masking factor similar to that illustrated in FIG. 13, but with corresponding more or fewer steps for determining the smallest subdivision common to the area from which the registrations have been received, as will be readily apparent to those skilled in the art. Further, there may be other factors to be considered as part of a methodology for selection of a masking factor. For example, such other factors may include time of day/day of week; frequency or infrequency of calls directed to the unit; telecommunications traffic conditions; system resources; and unit use profile of the user of the wireless communications unit.

The flow chart of FIG. 13 begins at step 100 wherein the controller monitors wireless communication unit communications. Although the flow chart in FIG. 13 discloses a method with respect to only one wireless communication unit, it will be understood that the controller simultaneously and similarly executes control over the other wireless communication units operating in the service area. With respect to a particular wireless communication unit operating in the service area, at decision step 101 the controller checks whether the location of the wireless communication unit has been determined in the service area within a preselected time period, such as the illustrated one hour. The location of the unit may have been determined one of several ways. For example, the unit may have registered with a cell in the service area within the last hour. Or, the system may have acquired knowledge of the unit's location within the last hour as a result of successful delivery of a communication to or the origination of a communication from the unit. If the location of the wireless communication unit has been determined (the answer to decision step 101 is "Yes"), the controller proceeds to step 103. At decision step 103, the controller checks whether the wireless communication unit has been involved in frequent registrations. For example, as illustrated in step 103, the controller may check whether the unit has registered more than a certain number of times within a predetermined period of time such as "X" times within the last two hours. If the unit has not been involved in frequent registrations (the answer to decision step 103 is "No"), the controller continues to monitor wireless communication unit communications, step 100. By a return to monitoring, the controller has determined that the unit does not require a new masking factor at this time. If, however, the unit has been involved in frequent registrations (the answer to decision step 103 is "Yes"), the controller proceeds to step 105.

At decision step 105, the controller begins the determination of whether the frequency of the registrations requires a new masking factor to be provided to the unit, or whether the registration frequency is justified based on the relative movements of the wireless communication unit in the service area. To illustrate this and subsequent steps, reference is made to service area 14 illustrated in FIG. 3 and FIGS. 14a–c.

At step 105, the controller determines whether all of the registrations came from the same general area, and in particular, in this example, whether all of the registrations were received from the same supercluster. If the registrations did not come from the same general area (the answer to decision step 105 is "No"), then this is an indication that the unit is traveling outside the general area so, in step 107, the controller provides the wireless communication unit with a broader masking factor. In this example, the controller provides the unit with the broadest masking factor (3). In particular, the controller has determined that the registrations came from different superclusters indicating that the unit is traveling in a relatively wide area including different superclusters, and that relatively frequent registrations are necessary for purposes of locating the unit quickly and efficiently. Then, the controller continues to monitor wireless communication unit communications, step 100.

If the registrations did come from the same area (the answer to decision step 105 is "Yes"), then the controller proceeds to decision step 109 wherein the controller determines whether all of the registrations were received from an area that is a subdivision of the general area checked in step 105. In this example, the controller determines whether all of the registrations were received from the same cluster. If not, this is an indication that in this example the unit is traveling within different clusters of a single supercluster. Therefore, in step 111 the controller provides the wireless communication unit with a less broad masking factor. In this example, the controller provides the unit with a supercluster level masking factor of (2). As a result of the new masking factor of "2", the unit registers only upon entry of a new general area, and in this example, entry into a supercluster different from supercluster "7". Thus, the registration frequency of the unit is reduced. Yet, the location of the unit is known to be somewhere within supercluster "7". Although this new masking factor provides the unit a relatively wide area of movement without registration, such minimal registration may be the optimum solution for a unit that travels only in one supercluster and receives few communications. Although the system must signal throughout the supercluster for the unit when a communication is to be directed to the unit, the relative infrequency of such communications and the fewer number of the unit's registrations conserve network resources. The controller then returns to step 100.

Referring again to step 109, if all of the registrations were received from the same subdivision of the general area, (the answer to decision step 109 is "Yes"), then the controller proceeds to decision step 113 wherein the controller determines whether all of the registrations were received from an area that is a subdivision of the subdivision area checked in step 109. In this example, the controller determines whether all of the registrations were received from the same cell. If not, this is an indication that in this example the unit is traveling within different cells of a cluster. Therefore then, this is an indication that the travel of the unit is limited to the subdivision of the general area, in this example, to the cluster. Based on this limited travel area, in step 115, the controller provides the wireless communication unit with a less broad masking factor. In this example, the controller provides the unit with a cluster level masking factor of (1). As a result of the new masking factor of "1", the unit registers only upon entry of a new subdivision of the general area, and in particular, in this example, entry of a cluster different from cluster "74". Although the system must signal throughout the cluster for the unit when a communication is to be directed to the unit, the relative infrequency of such communications and the fewer number of the unit's registrations conserve network resources. The controller then returns to step 100.

Referring again to step 113, if all of the registrations were received from the same subdivision (the same cell in this example), then this is an indication that the travel of the unit is limited to the subdivision (the cell in this example). Based on this limited travel area, in step 117 the controller provides the wireless communication unit with a less broad masking factor. In this example, the controller provides the unit with a cell level masking factor of (0). As a result of the new masking factor of "0", the unit registers only upon entry of a new subdivision, and in particular, in this example, entry of a cell different from cell "743". Although the unit will register if it moves out of the subdivision area, the relative infrequency of such movement conserves network resources. The controller then returns to step 100.

To summarize the preferred steps in determination of whether the frequency of the registrations of a particular wireless communication unit requires a new masking factor to be provided to the unit, (steps 101-117 of FIG. 13), the controller checks whether the location of the wireless communication unit has been determined within a relatively recent period of time, step 101. The controller then determines whether the unit has registered frequently within a selected period of time, step 103. If the unit has not registered frequently, the controller returns to monitoring wireless communication unit communications, step 100. If the unit has registered frequently, the controller determines whether the registrations were all received from a selected geographic division of the service area, step 105. If not, the controller provides a broader masking factor, step 107, and then returns to monitoring wireless communication unit communications, step 100. If the registrations were all received from the selected geographic division, the controller determines whether the registrations were all received from a smaller selected geographic division of the service area, step 109. If not, the controller provides a less broad masking factor, step 111, and then returns to monitoring wireless communication unit communications, step 100. If the registrations were all received from the smaller selected geographic division of the service area, the controller determines whether the registrations were all received from an even smaller selected geographic division of the service area, step 113. If not, the controller provides an even less broad masking factor, step 115, and then returns to monitoring wireless communication unit communications, step 100. If the registrations were all received from the even smaller selected geographic division, the controller provides an even less broad masking factor to the unit, step 117. The controller then returns to monitoring wireless communication unit communications, step 100.

In FIG. 13, referring again to decision step 101 wherein the controller checks whether the location of the wireless communication unit has been determined in the service area within a preselected time period, if the location has not been determined (the answer to decision step 101 is "No"), the controller proceeds to optional step 119 included in one embodiment of the invention. If step 119 is omitted, the controller returns to monitoring wireless communication unit communications, step 100.

If step 119 is used, in step 119 the controller makes a determination whether to provide the wireless communication unit with a less broad masking factor. As explained above, a less broad masking factor results in a curtailment of the service area within which the unit could move without registering with the system. Thus, it is more likely that a unit will register with the system as a masking factor is reduced, and therefore, that a unit's relatively specific location will be determined. Although the length of time since a unit's location has been determined by the system is one factor involved in determining whether to provide a unit with a less broad masking factor, there are other factors to be considered. For example, other factors may include the time of day/day of week; frequency or infrequency of calls directed to the unit; telecommunication traffic conditions; system resources; and unit use profile of the user of the wireless communications unit. If a determination is reached not to provide the unit with a less broad masking factor, the controller then returns to monitoring wireless communication units, step 100. If a determination is reached to provide the unit with a less broad masking factor, then in step 121 the controller provides such a masking factor. In an alternative embodiment, the masking factor is changed only in steps of one. Thus, using the simplified example again, if the masking factor was previously "3", then step 121 will cause the masking factor to be reduced to "2". If there are still no registrations, then the next time that step 121 is executed, the masking factor will be reduced to "1". Finally, the masking factor may be reduced to "0". The new masking factor is provided in an effort to promote more frequent registrations of the unit. Although minimizing the number of times a unit registers is an object of the present invention, another goal is to maintain information regarding the general location of the unit so as to efficiently and quickly deliver communications to the unit. To achieve this latter goal, the unit must provide the controller with periodic information relative to its general location through the registration process.

To summarize the preferred steps in determination of whether the lack of information regarding the location of a particular unit requires a new masking factor to be provided to the unit, (steps 101, 119 and 121 of FIG. 13), the controller checks whether the location of the unit has been determined within a preselected time period (step 101). If the location has not been determined, the controller checks whether a less broad masking factor should be provided to the wireless communication unit. If not, the controller returns to monitoring wireless communication unit communications, step 100. If a less broad masking factor is to be provided, the controller provides it in step 121, and then the controller returns to monitoring wireless communication unit communications, step 100. In an embodiment, the steps of checking whether the location of the unit has been determined within a preselected time and providing a new, narrower masking factor are repeated until the unit registers, thereby providing location information.

In some circumstances, the wireless communication unit may not receive the new masking factor from the controller. Such circumstances include the non-active status of the unit, or relocation of the unit outside the service area. For example, a wireless communication unit holds a small masking factor, thereby minimizing the probability of the number of times that the unit registers. The unit is turned off. Pursuant to the steps discussed in connection with FIG. 13, the controller ultimately determines that the unit has not registered or otherwise provided information regarding the unit's location within a predetermined period of time. The controller then attempts to provide the unit with a new masking factor, but the unit is turned off, and thus, the unit does not receive the new masking factor. As noted above, in an embodiment of the present invention, the controller receives an acknowledgment from a unit when the unit receives a new masking factor. In this example, the controller receives no acknowledgment from the unit because the unit has been turned off. Lacking an acknowledgment, the controller flags its entries regarding this particular wireless communication unit so that the unit is provided with a new masking factor when the unit is powered up and registers. Similar steps are followed with respect to a wireless communication unit that has left the service area for more than a predetermined amount of time.

In the preferred embodiment, when the controller does not receive an acknowledgment from a unit, the controller initiates an automatic timed decrementation program with respect to the masking factor to be provided to the wireless communication unit. For example, when the controller provides the unit with a new masking factor and fails to receive an acknowledgment, the controller starts a timer. If the unit has not registered or otherwise had its location determined by the timer's expiration, the controller automatically resets the masking factor held in the controller's memory to a narrower masking factor. The controller may attempt to provide the unit with the new masking factor (see step 115 of FIG. 13), or the controller may limit its attempts to provide a new masking factor to the unit to only preselected time intervals, or the controller may not even make an attempt to provide the new masking factor. Upon resetting of the masking factor, the controller again starts a timer. As before, if the unit has not registered or otherwise had its location determined by the timer's expiration, the controller automatically resets the masking factor to an even more narrower masking factor. The cycle of resetting the masking factor based on lack of information with respect to the wireless communication unit's location continues until the unit's location has been determined (and a new masking factor may be selected following the logic of FIG. 13), or until the most narrow masking factor applicable to the circumstances is reached.

Concurrently with the automatic decrementation of the masking factor by the controller, the wireless communication unit also follows an automatic time decrementation program with respect to its stored masking factor when certain conditions are encountered by the unit. These conditions may include a non-active status of the unit, or relocation of the unit outside the service area. Thus, for example, upon detection by the unit that it has been turned off, or that it has been moved to a different service area, the unit sets a timer for a predetermined interval. To ensure that the length of the decrementation intervals are the same between the wireless communication unit and the controller, the timer is set with regard to the time interval that has transpired since the last determination of location (such as registration) that the unit provided to the system controller. Upon expiration of this timer without communication of the unit's location to the system, the unit resets its masking factor to a narrower masking factor. Upon resetting of the masking factor, the unit again starts a timer. As before, if the unit has not registered or otherwise had its location determined by the timer's expiration, the controller automatically resets the masking factor to an even more narrower masking factor. The resetting of the masking factor based on lack of information with respect to the unit's location continues until the unit's location has been determined by the system, or until the most narrow masking factor is reached. The concurrent decrementation of the masking factor by the controller and the wireless communication unit ensures that the respective masking factors held by the controller and the unit are the same.

In another embodiment of the present invention, a wireless communication unit's masking factor automatically defaults to a predetermined narrow masking factor such as "0". For example, if "0" is used as the automatic default, the unit's identification signal held in memory corresponding to the cell where the unit last registered defaults to all "0's" when the unit is turned off or when the unit leaves the service area of the system. Thus, when the unit is turned on or enters a cell of the service area, the unit registers, thereby providing the system with information regarding the renewed activity of the unit within the service area.

Figure 14A:
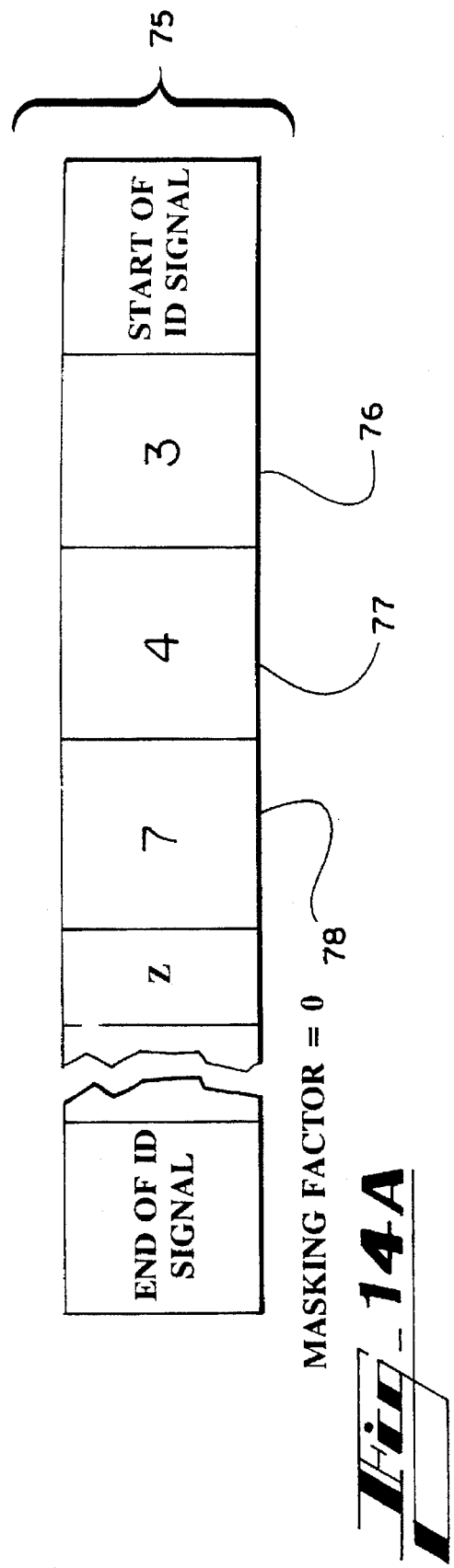
FIGS. 14a–b are diagrams illustrating, respectively, the effect of two masking factor choices on an identification signal.
Figure 14B:
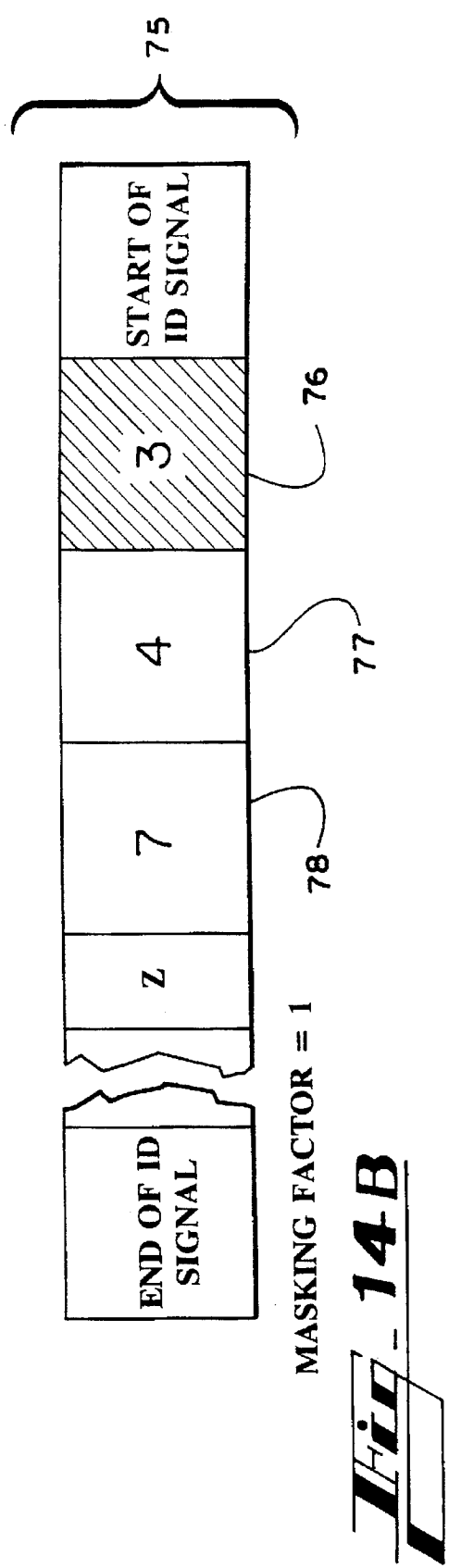

FIGS. 14a–b are diagrams illustrating, respectively, the effect of two masking factor choices on an identification signal such as the illustrated identification signal 75. In this example, the wireless communication unit has been engaged in frequent registrations. The masking factor that has been provided to the unit is "0". An embodiment of the present invention provides "0" as the default masking factor in case the controller does not provide the unit with a masking factor, or as the masking factor to be used when the unit first "powers up". As illustrated in FIG. 14a, application of the masking factor "0" to identification signal 75 results in the unmasked portion comprising the supercluster section 78 including the number "7", the cluster section 77 including the number "4", and the cell section 76 including the number "3", to-wit: "743". As a result of the masking factor of "0", every time the unit enters a new cell, the unit registers with that cell because the unmasked portion of the cell identification signal differs from the corresponding portion of the identification signal held in memory. In one embodiment, the masking factor is changed by one whole number at a time, and thus the controller changes the masking factor from "1" to "2", or from "2" to "3". In another embodiment the masking factor may change by more than one whole number. As illustrated in FIG. 14b, application of the masking factor "1" to identification signal 75 results in the unmasked portion comprising the supercluster section 78 including the number "7" and the cluster section 77 including the number "4", to-wit" 74. As a result of a masking factor of "1", the unit registers only upon entry of a cluster different from cluster "4". Thus, the registration frequency of the unit is reduced. Yet, the location of the unit is known to be somewhere within cluster "4".

In an embodiment of the present invention, the unit may provide the controller with an acknowledgment that the new masking factor has been received. By such acknowledgment, synchronization between the controller and the wireless communication unit regarding the new masking factor is achieved.

FIGS. 15a–c are diagrams illustrating, respectively, the effect of three masking factor choices on an identification signal such as the illustrated identification signal 75. The masking factor that has been provided to the unit is "2". Referring to FIG. 15a, application of the masking factor "2" to identification signal 75 results in the unmasked portion comprising the supercluster section 78 including the number "7". As a result of the masking factor of "2", the unit does not register unless the unit enters a new supercluster. In this example, the wireless communication unit has not registered or otherwise communicated within a relatively lengthy period of time thereby allowing for the assumption that the unit has not traveled out of the area corresponding to supercluster 7. Since the unit has not registered within a prescribed period of time, the controller provides the unit with a new masking factor. As previously stated, preferably, the masking factor is changed by only one whole number at a time, and thus, in the example, the controller provides the wireless communication unit with a masking factor of "1". As illustrated in FIG. 15b, application of the masking factor "1" to identification signal 75 results in the unmasked portion comprising the supercluster section 78 including the number "7" and the cluster section 77 including the number "4", to-wit: 74. As a result of the new masking factor of "1", the unit registers upon entry of a cluster different from cluster "4". Thus, the probability of registration of the unit is increased.

If the unit still has not registered within a prescribed period of time, the controller provides the unit with another masking factor. Referring to FIG. 15c, in this example the unit has been provided with a new masking factor of "0". Application of the masking factor "0" to identification signal 75 results in the unmasked portion comprising the supercluster section 78 including the number "7", the cluster section 77 including the number "4", and the cell section 76 including the number "3", to-wit: "743". As a result of the masking factor of "0", when the unit enters a new cell, the unit registers with that cell because the unmasked portion of the cell identification signal differs from the corresponding portion of the identification signal held in memory. Thus, the probability of registration of the unit is increased. It will be understood by those skilled in the art that additional decision steps for determining whether a unit has registered within a preselected period of time and for providing a new masking factor may be desirable and/or necessary depending upon the size of the service area, number of wireless communication units operating in the service area, length of time without registration, and other considerations.

Figure 16:
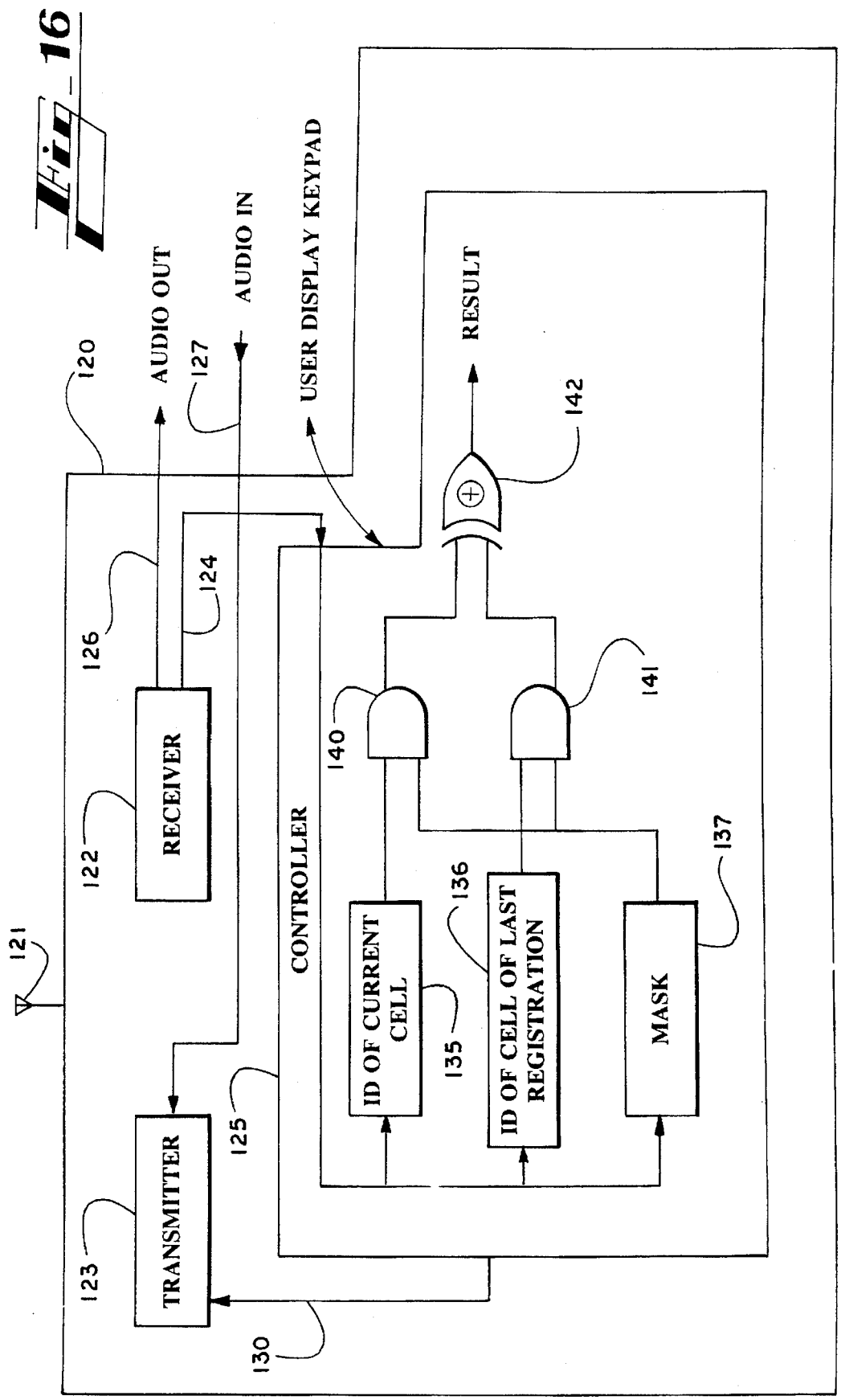
FIG. 16 is a diagram illustrating the logical operation of the preferred general apparatus comprising a wireless communication unit in a wireless communication system according to the preferred embodiment.

FIG. 16 illustrates the general apparatus comprising a wireless communication unit 120 operating in a wireless communication system according to the preferred embodiment. When a wireless communication unit 120 enters a cell of the service area, the unit reads the identification signal of the cell where the unit is located by monitoring the strongest control channel transmitted by the cell. Wireless communication unit 120 comprises an antenna 121, a receiver 122, and a transmitter 123. Receiver 122 has an audio output 126 and a data output 124. Transmitter 123 has an audio input 127 and a data input 130. The construction and operation of antenna 121, receiver 122, and transmitter 123 are conventional in nature.

Wireless communication unit 120 also comprises a controller 125. With the exception of the improvements described herein relating to the present invention, the construction and operation of a controller 125 for a wireless communication unit 120 is well known. Controller 125 comprises an "ID of current cell" register or memory space 135, an "ID of cell of last registration" register or memory space 136, and a "mask" register or memory space 137. The outputs of cell ID registers 135 and 136 are connected to inputs of AND gates 140 and 141, respectively. Also, the output of mask register 137 is connected to inputs of AND gates 140 and 141. AND gates 140 and 141 therefore perform the function of masking the unneeded parts of the cell ID. The outputs of gates 140 and 141 are therefore the masked current cell ID and the masked ID of cell of last registration, respectively. The outputs of gates 140 and 141 are connected to the inputs of an exclusive OR gate 142. Gate 142 performs a comparison of the masked cell ID's. If the masked cell ID's are identical then the output of gate 142 will be a logic "0". If the masked cell ID's are different in any respect then the output of gate 142 will be a logic "1". Thus, the output of gate 142 indicates whether registration is required or not.

If registration is not required then controller 125 will continue reading the ID of the current cell and any new masking factor provided via receiver 122, storing this information in register 135 and 137, as required, and performing the comparison.

If registration is required then controller 125 will send registration data to transmitter 123, which will broadcast the registration data via antenna 121. Controller 125 will also cause the ID of the current cell to be stored in the last registration register 136, thereby updating register 136. Controller 125 will then continue reading the ID of the current cell and any new masking factor provided via receiver 122, storing this information in register 135 and 137, as required, and performing the comparison.

For ease of illustration, only single gates 140, 141 and 142 are shown. However, it will be appreciated that the cell ID numbers are several bits long and therefore bit-by-bit masking and comparison are required and are preferably accomplished via a paralleled plurality of gates. Also, it will be appreciated that controller 125 is typically a microprocessor and components 135–137, 140–142 and connections between these components are provided by the proper programming of controller 125.

In an embodiment, a default identification signal may be held in ID memory 136 instead of the identification signal where the unit last registered if the unit has been turned off since its last registration, if the unit has never before entered the service area of the system, or if the unit has been absent from the service area for a predetermined period of time. In an embodiment, the mask memory 137 has a default masking factor for use when the unit is turned on, when the unit first enters the service area of the system, or when the unit re-enters the service area of the system after a predetermined period of time of absence thereof.

Referring now to the circumstances, when wireless communication unit 120 changes its location to a different cell, the unit receives the identification signal of the different cell.

As before, the identification signal of the different cell is provided to current ID register 135. The masking factor is then applied. Gate 142 compares the corresponding portions of the identification signals of the cell of last registration and the current cell to determine whether there is a difference between them. If there is no difference, unit 120 continues to monitor the strongest paging channel of the cell where the unit is located. If a difference exists, then the predetermined spatial relationship is present and as before, results in registration of unit 120 in the current cell. After registration in the current cell, the current cell identification signal is substituted in ID memory 136 as the identification signal of the cell where the unit last registered. Thus, these steps are repeated whenever unit 120 receives an identification signal of a cell in the area serviced by the system.

As noted above, wireless communication unit 120 may be provided with a new or different masking factor from the controller of the wireless communication system in order to induce the unit to register or to minimize the number of registrations of the unit.

The preferred embodiment of the present invention has been disclosed by way of example and it will be understood that other modifications may occur to those skilled in the art without departing from the scope and the spirit of the appended claims.

I claim:

1. A method of operating a wireless communication unit in a wireless communication system servicing a geographic area divided into cells, each cell having a base station, comprising the steps of:

receiving a control signal from a base station in a first cell, wherein said control signal of said first cell comprises an identification signal unique to said first cell;

applying a masking factor to said identification signal of said first cell to provide a portion of said identification signal;

registering said wireless communication unit in said first cell;

receiving a control signal from a base station in a second cell, wherein said control signal of said second cell comprises an identification signal unique to said second cell;

determining a portion of said identification signal of said second cell, said portion of said identification signal of second cell corresponding to said portion of said identification signal of said first cell;

performing a comparison between said control signal of said first cell and said control signal of said second cell;

determining on the basis of said comparison whether said first cell and said second cell exist in a preselected relationship; and if said preselected relationship is present, then registering said wireless communication unit in said second cell.

2. The method of claim 1, wherein said step of determining said portion of said identification signal of said second cell comprises applying said masking factor to said identification signal of said second cell to determine said portion of said identification signal of said second cell.

3. The method of claim 1, wherein said step of performing said comparison comprises comparing said portion of said identification signal of said first cell to said portion of said identification signal of said second cell.

4. The method of claim 3, wherein said step of determining on the basis of said comparison whether said first cell and said second cell exist in said preselected relationship comprises determining that said preselected relationship is present when said portion of said identification signal of said first cell differs from said portion of said identification signal of said second cell.

5. A method of operating a wireless communication unit in a wireless communication system servicing a geographic area divided into cells, each cell having a base station, comprising the steps of:

receiving a control signal from a base station in a first cell, wherein said control signal of said first cell comprises an identification signal unique to said first cell;

registering said wireless communication unit in said first cell;

receiving a control signal from a base station in a second cell, wherein said control signal of said second cell comprises an identification signal unique to said second cell;

performing a comparison of said identification signal of said first cell to said identification signal of said second cell to obtain a product;

applying a masking factor to said product to determine a portion of said product;

determining on the basis of said comparison whether said first cell and said second cell exist in a preselected relationship; and if said preselected relationship is present, then registering said wireless communication unit in said second cell.

6. The method of claim 5, wherein said step of determining that said preselected relationship is present when said portion of said product is a predetermined value.

7. The method of claim 5, wherein said step of comparing said identification signals to obtain said product comprises adding said identification of said first cell to said identification signal of said second cell to obtain said product.

8. A method of operating a wireless communication unit in a wireless communication system servicing a geographic area divided into cells, each cell having a base station for transmitting an identification signal which identifies that particular cell and the relationship of that particular cell to other cells of said area, comprising the steps of:

receiving an identification signal from a base station in a first cell;

registering said wireless communication unit in said first cell;

applying a masking factor to said identification signal of said first cell to provide a portion of said identification signal of said first cell;

receiving an identification signal from a base station in a second cell;

applying said masking factor to said identification signal of said second cell to provide a portion of said identification signal of said second cell;

performing a comparison between said portion of said identification signal of said first cell and said portion of said identification signal of said second cell;

determining on the basis of said comparison whether said first cell and said second cell exist in a preselected relationship; and if said preselected relationship is present, then registering said wireless communication unit in said second cell.

9. The method of claim 8, further comprising the step of:

after said step of registering said wireless communication unit in said second cell, applying a different masking factor to said identification signal of said second cell to provide said portion of said identification signal of said second cell.

10. The method of claim 8, further comprising the step of receiving said masking factor from said base station of said first cell or said base station of said second cell.

11. The method of claim 1 or 8, further comprising the steps of:
   determining whether at least a preselected time has passed since a most recent registration of said wireless communication unit; and
   if said preselected time has passed, then registering said wireless communication unit in said second cell or in the cell of location of said unit, if said cell of location is different from said second cell.

12. The method of claim 1 or 8, further comprising the steps of:
   determining whether at least a preselected time has passed since a most recent registration of said wireless communication unit; and
   if said preselected time has passed then substituting a different masking factor for said masking factor.

13. A method of managing a wireless communication system servicing wireless communication units operating in a geographic area divided into cells, each cell having a base station for transmitting an identification signal which identifies that particular cell and the relationship of that particular cell to other cells of said area, comprising the steps of:
   transmitting an identification signal from a base station in a first cell;
   registering a wireless communication unit in said first cell;
   transmitting an identification signal from a base station in a second cell;
   providing said wireless communication unit with a masking factor to apply to said identification signal of said first cell to determine a portion of said identification signal of said first cell and to apply to said identification signal of said second cell to determine a portion of said identification signal of said second cell; and
   registering said wireless communication unit in said second cell if a comparison performed by said wireless communication unit between said portions results in a determination that said first cell and said second cell exist in a preselected relationship.

14. The method of claim 13, further comprising the step of:
   after said step of registering said wireless communication unit in said second cell, providing said wireless communication unit with a different masking factor to apply to said identification signal of said second cell to determine said portion of said identification signal of said second cell.

15. The method of claim 13, further comprising the steps of:
   determining whether at least a preselected time has passed since a most recent registration of said wireless communication unit; and
   if said preselected time has passed, then registering said wireless communication unit in said second cell or in the cell of location of said unit, if said cell of location is different from said second cell.

16. The method of claim 13, further comprising the steps of:
   determining whether at least a preselected time has passed since a most recent registration of said wireless communication unit; and
   if said preselected time has passed, then providing said wireless communication unit with a different masking factor.

* * * * *